(12) United States Patent
Inaba et al.

(10) Patent No.: US 6,392,311 B2
(45) Date of Patent: May 21, 2002

(54) STARTER GENERATOR FOR INTERNAL COMBUSTION ENGINE

(75) Inventors: Yutaka Inaba; Mitsuyoshi Shimazaki; Masanori Nakagawa; Shuichi Muramatsu, all of Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/748,314

(22) Filed: Dec. 26, 2000

(30) Foreign Application Priority Data

Dec. 28, 1999 (JP) ........................... 1999-374392
Sep. 4, 2000 (JP) ........................... 2000-267444

(51) Int. Cl.[7] ............. H02P 9/04; F02N 11/00; F02N 11/04; H02K 23/52
(52) U.S. Cl. ........................ 290/38 R; 290/31; 290/46; 74/7 R
(58) Field of Search ................ 290/38 R, 46, 290/31; 74/7 R

(56) References Cited

U.S. PATENT DOCUMENTS

| | | | | | |
|---|---|---|---|---|---|
| 3,941,204 A | * | 3/1976 | Kurii et al. | ........ | 123/179.3 |
| 4,045,062 A | * | 8/1977 | Disosway et al. | ........ | 290/37 A |
| 4,156,817 A | * | 5/1979 | Preece et al. | ........ | 123/179.25 |
| 4,219,739 A | * | 8/1980 | Greenwell | ........ | 290/38 R |
| 4,316,095 A | * | 2/1982 | Laffoon et al. | ........ | 290/36 R |
| 4,366,385 A | * | 12/1982 | Williams | ........ | 123/179.25 |
| 4,507,565 A | * | 3/1985 | Hamano | ........ | 290/38 B |
| 4,525,632 A | * | 6/1985 | Tanaka | ........ | 290/38 A |
| 4,553,441 A | * | 11/1985 | Hamano et al. | ........ | 290/38 R |
| 4,738,148 A | * | 4/1988 | Norton | ........ | 290/38 R |
| 4,803,377 A | * | 2/1989 | Iwatani et al. | ........ | 290/38 R |
| 4,841,216 A | * | 6/1989 | Okada et al. | ........ | 290/38 R |
| 4,862,010 A | * | 8/1989 | Yamamoto | ........ | 290/38 C |
| 5,111,057 A | * | 5/1992 | Sugiyama | ........ | 290/38 R |
| 5,495,127 A | * | 2/1996 | Aota et al. | ........ | 290/10 |
| 5,508,566 A | * | 4/1996 | Nagao et al. | ........ | 290/38 R |
| 5,731,638 A | * | 3/1998 | Niimi | ........ | 123/179.1 |
| 5,818,116 A | * | 10/1998 | Nakae et al. | ........ | 123/339.1 |
| 5,848,577 A | * | 12/1998 | Sappe et al. | ........ | 123/179.3 |
| 6,202,615 B1 | * | 3/2001 | Pels et al. | ........ | 123/179.21 |

FOREIGN PATENT DOCUMENTS

| | | |
|---|---|---|
| JP | 58063085/1983 | 4/1983 |
| JP | 91064/1991 | 9/1991 |
| JP | 8 289520/1996 | 11/1996 |
| JP | 11032467/1999 | 2/1999 |

* cited by examiner

Primary Examiner—Nestor Ramirez
Assistant Examiner—Pedro J. Cuevas
(74) Attorney, Agent, or Firm—Pearne & Gordon LLP

(57) ABSTRACT

A starter generator for an internal combustion engine serving as a starter motor when the internal combustion engine should start and as a generator after the internal combustion engine starts and comprising a magnet rotor and a stator having a plural of coils, a plural of switch circuits to switch a current flowing through the coils and a switch controller to control switch elements of the switch circuits whereby the current flows through all the coils by controlling the switch circuits in accordance with a position of the rotor when the engine should start to thereby produce a large torque and the current flows through one or some of the coils via a rectifying circuit of rectifying diodes provided in some switch circuits after the engine starts to thereby charge the battery.

9 Claims, 17 Drawing Sheets

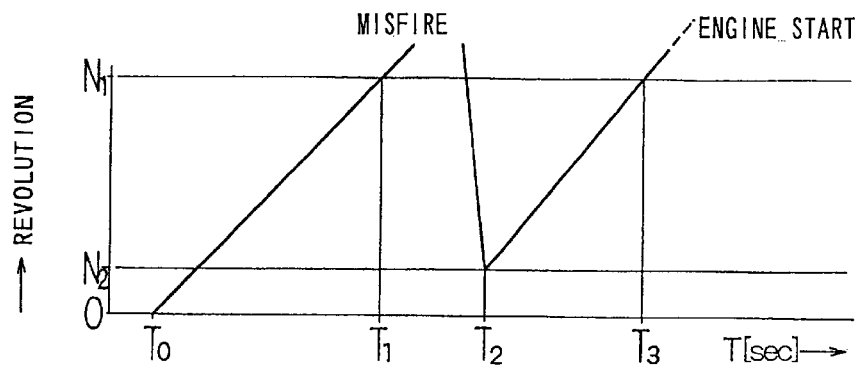
Fig. 6A
Fig. 6B
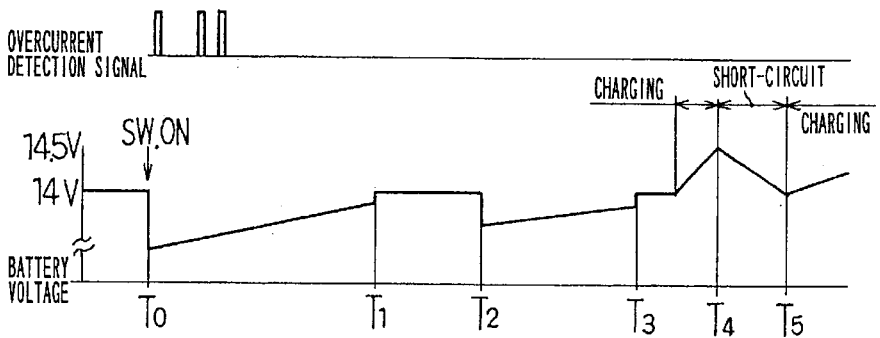
Fig. 6C
Fig. 6D  Vh
Fig. 6E  ACE
Fig. 6F  A'C'E'
Fig. 6G  BDF
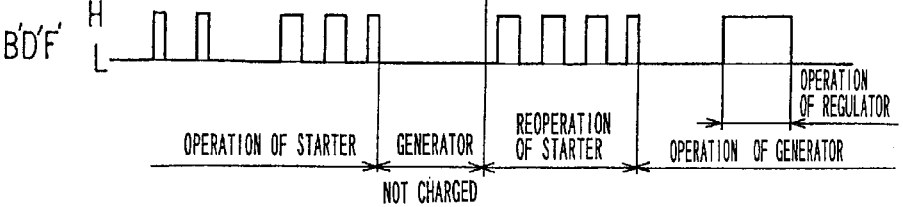
Fig. 6H  B'D'F'

STARTER GENERATOR FOR INTERNAL COMBUSTION ENGINE

TECHNICAL FIELD OF THE INVENTION

This invention pertains to a starter generator for an internal combustion engine (an internal combustion engine starting motor and generator apparatus) serving as a starter motor when the internal combustion engine should start and as a generator after the engine starts.

BACKGROUND OF THE INVENTION

There has been provided in an internal combustion engine a generator for driving various car electric devices. A conventional generator for an internal combustion engine comprises a flywheel magnet rotor mounted on a crankshaft of the engine and a stator having armature coils wound on an armature core. The stator is provided with various generator coils for driving various car electric devices necessary for driving the engine such as an ignition system for the internal combustion engine, a fuel injection apparatus and so on and a generator coil for supplying an electric power for driving arbitrarily driven loads such as lamp loads, a battery and so on.

A ring gear is secured onto an outer peripheral wall of the flywheel of the flywheel magnet rotor and a starter motor (an engine starting motor) is mounted on an engine case. A pinion gear is mounted on an output shaft of the starter motor. The pinion gear is adapted to be moved in a forward direction when the starter motor is driven and meshed with the ring gear so that the flywheel magnet rotor rotates together with the crankshaft.

Thus, as the magnet rotor rotates, a voltage is induced across the igniting generator coil provided in the stator, which causes the ignition system for the internal combustion engine to ignite the engine so that the engine starts.

Since the conventional internal combustion engine is required to have the starter and the ring gear provided on the outer peripheral face of the flywheel for starting the engine as aforementioned, the engine cannot be avoided from having a complicated construction.

As disclosed in JP58-63085, there has been proposed a starter generator that comprises an electric rotary machine having a rotor mounted on a crankshaft of an internal combustion engine and serving as an electric motor for starting the engine and as a generator after the engine starts.

However, since the starter motor (the engine starting motor) and the battery charging generator have a different winding specification necessary for meeting the characteristics required for the starter motor and the battery charging generator, respectively, the single electric rotary machine cannot be practically used as both of the starter motor and the generator even though it may be established as an idea.

More particularly, since the starter motor is required to produce a high torque when the engine should start, the generator can be also used as the starter motor as long as it should have a smaller winding resistance of the armature coils which is required for momentarily passing a larger current when the engine should start. This requires a smaller number of turns of the armature coils and a thicker diameter of the coil conductor for using the generator as the starter motor.

Since the generator is required to charge the battery with the output thereof after the engine starts, the number of turns of the armature coils should be so set that the generation output thereof around the idling revolution of the engine is substantially equal to the battery voltage.

However, with the generator for the internal combustion engine constructed in this manner, the battery is possibly damaged because the charging current for the battery is too large when the engine rotates at middle or high speed.

It will be considered that in order to prevent the battery from being over-charged a regulator is provided for shorting the output of the generator when the voltage applied across the battery gets excessive. However, with the generator having the winding resistance set to be smaller as aforementioned and the short-circuit type regulator used in combination, electronic parts for the regulator will be possibly broken due to the excessive short current.

As disclosed in JUM (Utility Model) 3-91064, there has been well known a starter generator that comprises a stator having a commutator connected to armature coils and a magnet rotor having a brush engaging the commutator in a sliding manner. The starter generator is operated as a DC motor with a brush while engaging the brush with the commutator when the engine should start and as a generator by moving the brush away from the commutator by a centrifugal clutch mechanism after the engine starts.

Such a starter generator can produce an enough starting torque by supplying the drive current to all the armature coils of the stator when the engine should start and can prevent the battery from being over-charged by supplying the output taken out from some of the armature coils through a rectifier after the engine starts.

However, since the starter generator is required to have the centrifugal clutch mechanism provided for moving the brush away from the commutator after the engine starts, the construction of the starter generator is complicated, which causes the cost to be inevitably expensive. Also, the brush and the commutator are consumed due to the engagement of the brush with the commutator when the engine should start and therefore the maintenance will be required.

SUMMARY OF THE INVENTION

Accordingly, it is a principal object of the invention to provide a starter generator for an internal combustion engine adapted to produce a high torque required to start the internal combustion engine when it should be used as a starter motor and to restrain an output thereof when it should be used as a generator so that the battery is prevented from being over-charged.

The present invention pertains to a starter generator serving as a starter motor when an internal combustion engine should start and as a generator for generating an output for charging a battery after the engine starts.

The starter generator according to the invention comprises a magnet rotor mounted on a crankshaft of the internal combustion engine, a stator, a rotor magnetic pole sensor for detecting whether the magnetic pole of the magnet rotor passing a particular position on the side of the stator is a N pole or a S pole, first through fourth switch circuits connected in parallel to both ends of the battery and a switch controller to control switch elements of the first through fourth switch circuits in accordance with the output of the rotor magnetic pole sensor.

More particularly, the magnet rotor is so constructed as to have a filed system of n poles (n is an even number of more than 4) disposed at an equal angle distance.

The stator comprises $m$ ($m=n \times \alpha$) coils ($\alpha$ is an integral number of more than 1) wound on an armature core with a winding direction identical to each other so that they are placed in order of a rotational direction of the magnet rotor and connected in series in order to each other so that they form a closed circuit and includes 1st through mth tap terminals led out from connection points between terminating ends of the 1st through mth coils and beginning ends of the coils adjacent to the 1st through mth coils so that the alternate tap terminals of the same phase among the tap terminals provide a first group of the tap terminals and the remaining alternate tap terminals of the phase reverse to those of the first group form a second group of the tap terminals.

The respective coils may be formed by winding electric conductors having a relatively larger cross section in order to pass a larger current through the coils when the internal combustion engine should start. The respective coils may have a number of turns so set that the stator can generate a voltage substantially equal to a battery voltage when the engine rotates at an idling revolution or more or less after the engine starts.

The rotor magnetic pole sensor serves to detect whether the magnetic pole of the magnet rotor passing a detection position set between particular two adjacent coils selected among the 1st through mth coils is the N pole or the S pole and to output a magnet pole detection signal of level different on the N pole and the S pole of the detected magnetic poles. The rotor magnetic pole sensor may comprise a magnetic sensor such as a hole IC to directly detect the polarity of the magnetic poles of the magnet rotor or may comprise an appropriate sensor to indirectly detect the polarity of the magnetic poles of the magnet rotor passing the position between the particular two adjacent coils of the stator. As the sensor to indirectly detect the polarity of the magnetic poles of the magnet rotor may be used a photo-encoder that comprises a photo-interrupter (a code plate) having a slit provided at a position corresponding to the magnetic pole of one polarity (N pole, for instance) of the magnet rotor and provided so as to rotate together with the magnet rotor and a luminous element and a light receiver faced each other with the photo-interrupter placed between them.

Although a general brushless DC motor has to be provided with sensors for detecting the magnetic poles of the rotor for the respective multiphase armature coils, the starter generator of the invention may be provided with just one rotor magnetic pole sensor.

The first switch circuit may comprise an upper switch element and a lower switch element connected in series to the upper switch element, an upper rectifying diode connected in parallel to the upper switch element with an anode faced to the lower switch element and a lower rectifying diode connected in parallel to the lower switch element with a cathode faced to the upper switch element. The upper switch element is connected to both ends of the battery while being faced to a positive terminal of the battery. At least one of the first switch circuits may be provided and an intermediate terminal led out between the upper and lower switch elements is connected to at least one of the tap terminals of the first group of the stator.

The second switch circuit may be constructed in the same manner as the first switch element circuit. At least one of the second switch circuits may be provided and the intermediate terminal thereof is connected to at least one of the tap terminals of the second group.

The third switch circuit may comprise an upper arm and a lower arm connected in series to the upper arm. The upper arm may comprise a series circuit of an upper switch element and an upper charge prevention diode disposed in a forward direction relative to a conduction direction of the upper switch element when it is turned on. The lower arm may comprise a lower switch element and a lower charge prevention diode disposed in a forward direction relative to a conduction direction of the lower switch element when it is turned on. The third switch circuit is connected to both ends of the battery while the upper arm is placed on the side of a positive terminal of the battery. At least one of the third switch circuits may be provided and an intermediate terminal led out between the upper and lower arms is connected to at least one of the tap terminals of the first group of the stator that is not connected to the intermediate terminal of the first switch circuit.

The fourth switch circuit may be constructed in the same manner as the third switch element circuit. At least one of the fourth switch circuits may be provided and the intermediate terminal thereof is connected to at least one of the tap terminals of the second group that is not connected to the intermediate terminal of the second switch circuit.

The switch controller to control the first through fourth switch circuits serves to control their conduction so as to turn on the upper switch elements of the first and third switch circuits and the lower switch elements of the second and fourth switch circuits when an output of the rotor magnetic pole sensor is at one of the levels and to turn on the upper switch elements of the second and fourth switch circuits and the lower switch elements of the first and third switch circuits when the output of the rotor magnetic pole sensor is at other level whereby the magnet rotor rotates in the rotational direction of the crankshaft when the internal combustion engine should start.

With the starter generator constructed in the aforementioned manner, since the larger torque can be produced by passing the drive current through all the coils of the stator when the internal combustion engine should start, the engine can start without any trouble.

After the engine starts, the charging current is supplied to the battery through a full wave rectifying circuit formed of the upper and lower rectifying diodes of the first and second switch circuits. At that time, since the output of the coils to which the third and fourth switch circuits are connected are not supplied to the battery, an excessive charging current is prevented from flowing through the battery when the engine rotates at the middle or high speed.

Although, in the aforementioned construction, the third and fourth switch circuits are provided with the charge prevention diodes for preventing the charging current from flowing through the battery, the charge prevention diodes may be omitted from the third and fourth switch circuits and the intermediate terminals led out between the upper and lower switch elements of these switch circuits may be connected to the predetermined tap terminals through tap selection switches which are controlled in accordance with the revolution of the engine so that they are at the on-state when the revolution of the engine is less than an engine start completion revolution corresponding to the one after the engine completes starting, but are at the off-state when the revolution of the engine is equal to or more than the engine start completion revolution.

In case that the starter generator is constructed in aforementioned manner, since the larger torque can be produced by passing the drive current through all the coils of the stator when the internal combustion engine should start. After the engine starts, the charging current is supplied to the battery through the full wave rectifying circuit formed of the upper and lower rectifying diodes of the first and second switch circuits, but the charging current never is never supplied to the battery through the third and fourth switch circuits. Thus, the battery can be prevented from being over-charged.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIG. 6 is a time chart illustrating the operation of the aforementioned starter generator;

DETAILED DESCRIPTION OF PREFERRED EMBODIMENTS

Figure 1:
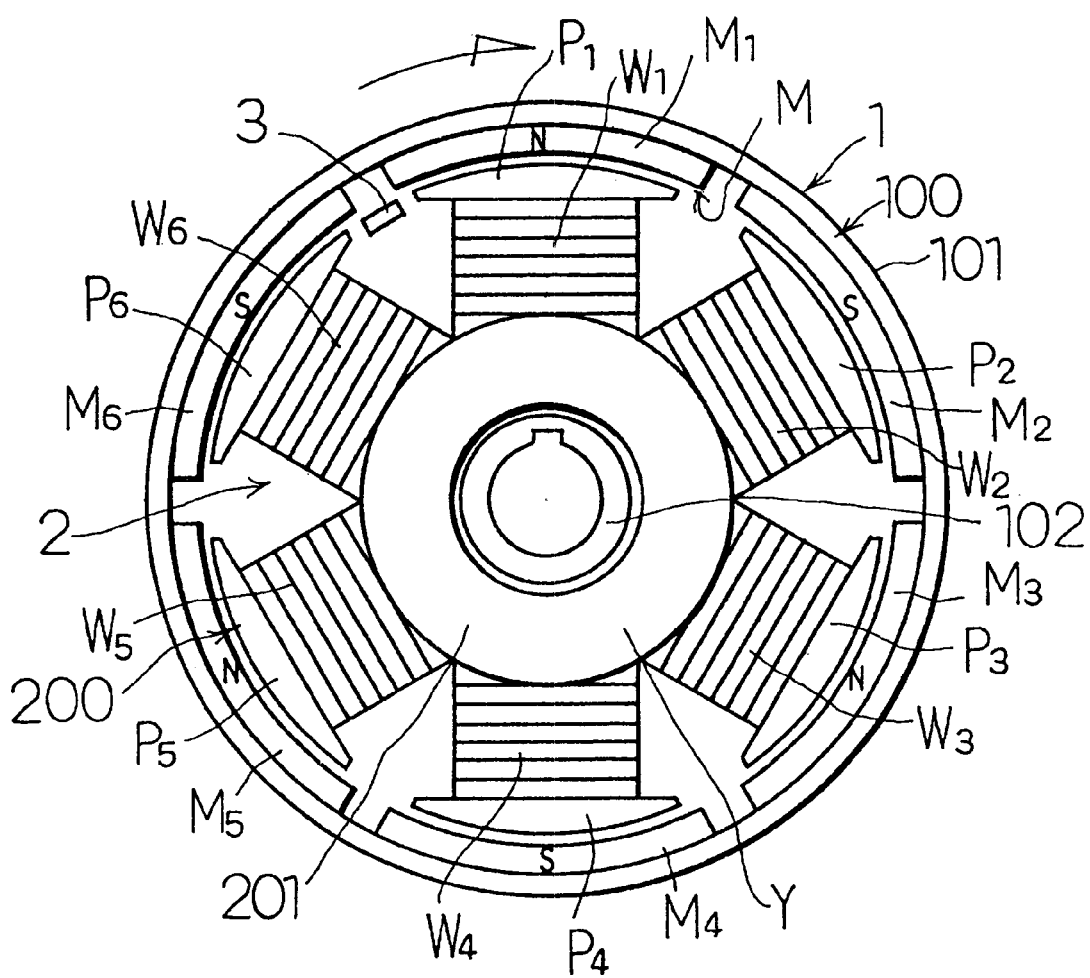
FIG. 1 is a front view of a mechanical portion of a starter generator constructed in accordance with an embodiment of the invention.

FIG. 1 illustrates an embodiment of a starter generator of the invention and in this figure, a numeral 1 designates a magnet rotor and a numeral 2 designates a stator. The magnet rotor 1 comprises a flywheel 100 formed of ferromagnetic materials such as iron and having a cup shape and arc-like permanent magnets M1 through M6 magnetized in a diametrical direction of the flywheel 100 and mounted on a peripheral wall 101 of the flywheel 100 at an equal angle distance.

The magnets M1 through M6 are so magnetized as to have magnetic poles (S pole and N pole) of different polarities alternately arranged in the peripheral direction of the flywheel. These magnets form a magnet field system M having six magnetic poles arranged at an equal angle distance.

Figure 19:
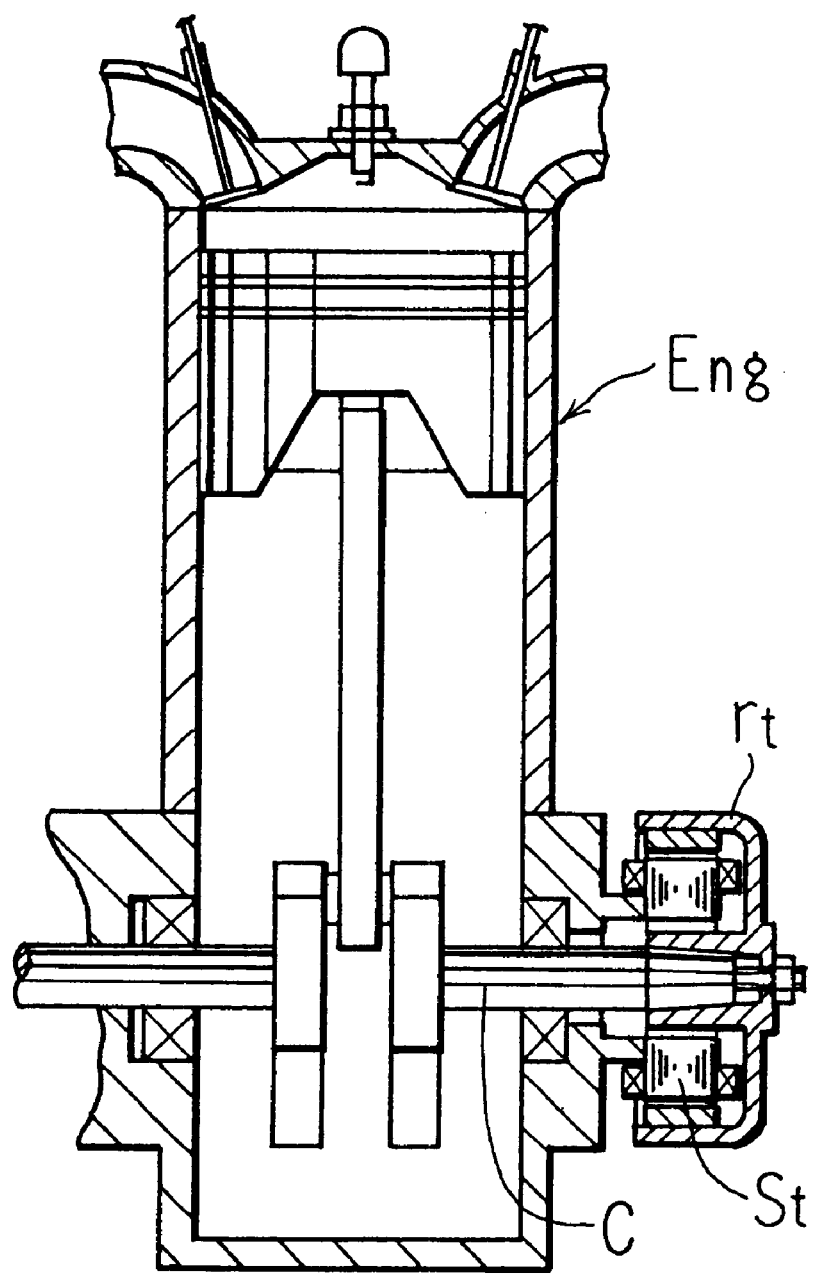
FIG. 19 is a cross sectional view of the starter generator mounted on the engine.

At a center portion of a bottom wall of the flywheel 100 is provided a rotary shaft-mounting boss 102, which is in turn mounted on a crankshaft c of an internal combustion engine Eng as shown in FIG. 19.

The stator 2 comprises an armature core 200 and first through sixth coils W1 through W6 wound on the armature core 200. The armature core 200 comprises an annular yoke Y and first through sixth salient pole portions P1 through P6 extending at an equal angle distance in a radial direction from an outer periphery of the yoke Y. The first through sixth coils W1 through W6 are wound in a concentrated manner on the salient pole portions P1 through P6, respectively. The first through sixth coils W1 through W6 are wound on the armature core 200 so that they are arranged in order of the rotational direction of the magnet rotor 1 with their winding directions identical to each other and connected in order in series to each other to form a closed circuit.

Figure 2:
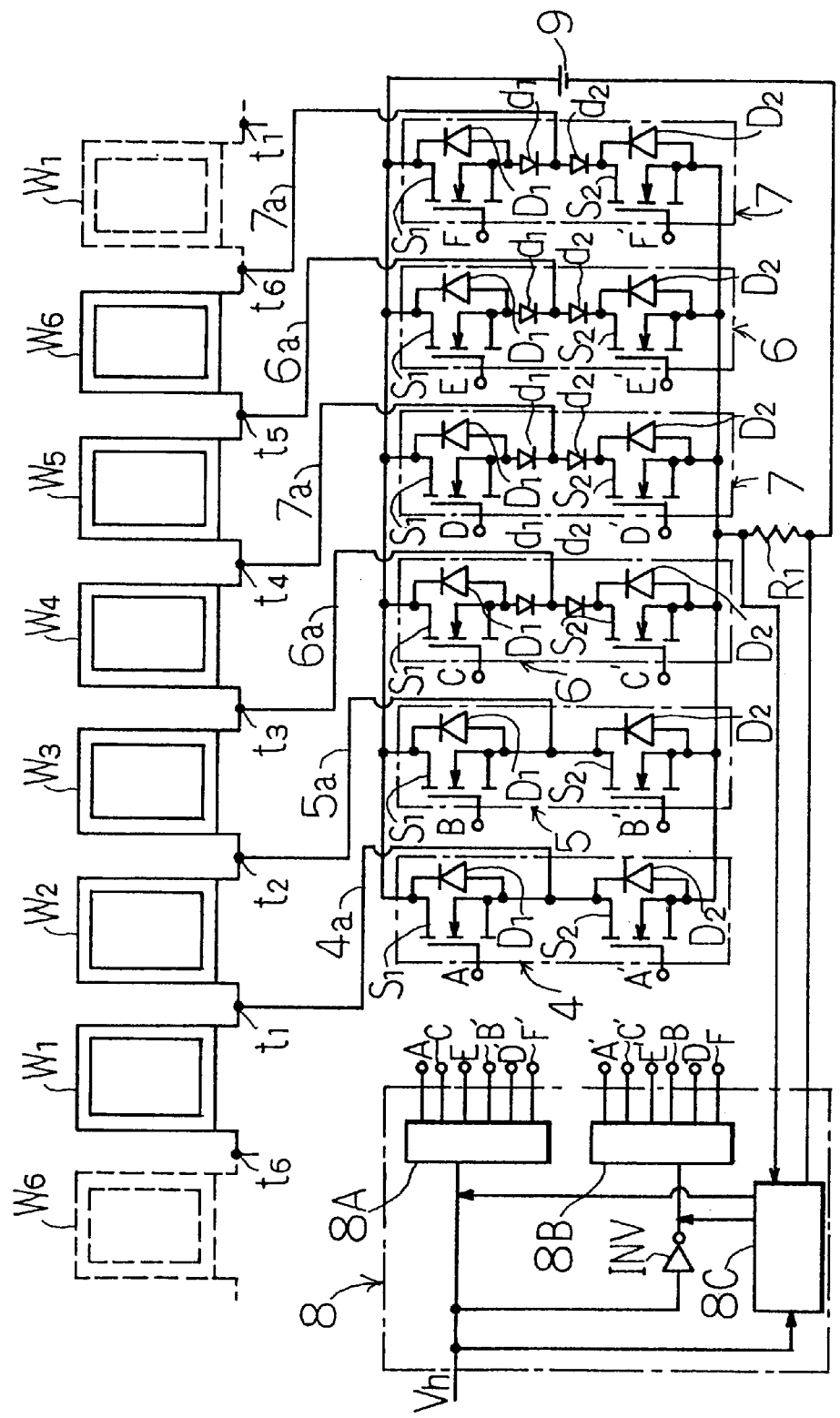
FIG. 2 is a circuit diagram of an embodiment of a drive circuit used for the starter generator of FIG. 1.

As shown in FIG. 2, first through sixth tap terminals t1 through t6 are led out from connection points of terminating ends of the first through sixth coils W1 through W6 and beginning ends of the coils adjacent thereto. The alternate three tap terminals t1, t3 and t5 of the same phase provide a first tap terminal group while the remaining alternate three tap terminals t2, t4 and t6 of the phase reverse to those of the first tap terminal group form a second tap terminal group.

What is meant by the tap terminals of the same phase is ones connected to the coil having an equal phase relation to the magnetic pole of the magnet rotor. For instance, in the instant condition shown in FIG. 1, the coil W1 phase-advanced in the rotational direction of the rotor among the coils W1 and W2 connected to the tap terminal t1 is faced to the N pole, but at that time, the coils W3 and W5 phase-advanced among the coils W3 and W4 connected to the tap terminal t3 and the coils W5 and W6 connected to the tap terminal t5 are faced also to the N pole.

As shown in this figure, when the phase-advanced coils W1, W3 and W5 among the coils connected to the tap terminals t1, t3 and t5, respectively are faced to the N pole, the phase-advanced coils W2, W4 and W6 among the coils connected to the tap terminals t2, t4 and t6 of the phase reverse to those of the tap terminals t1, t3 and t5, respectively are faced to the S pole.

As shown in FIG. 19, the stator 2 may be mounted on a stator mount provided on a case or the like of the internal combustion engine Eng while the magnetic poles of the salient portions P1 through P6 are faced to the magnetic poles of the magnet rotor 1 with a predetermined gap placed between them.

In this embodiment, the single rotor magnetic pole sensor 3 is securely provided on the stator 2. The illustrated rotor magnetic pole sensor 3 may comprise a magnetic sensor to detect the polarity of the magnetic pole of the magnet rotor 1 passing a detection position between the particular two adjacent coils of the stator 2 (in the illustrated embodiment, the adjacent two coils W6 and W1). The sensor outputs a magnetic pole detection signal of level different on the N pole and the S pole of the detected magnetic poles. A hole IC may be used for the magnetic sensor.

In the embodiment illustrated in FIG. 1, there is provided a drive circuit that comprises a single first switch circuit 4, a single second switch circuit 5, two or double third switch circuits 6, two or double fourth switch circuits 7 and a switch controller 8 to control switch elements of these switch circuits.

The first switch circuit 4 includes an upper switch element S1 and a lower switch element S2 connected in series to the upper switch element S1, an upper rectifying diode D1 connected in parallel to the upper switch element S1 with an anode faced to the lower switch element S2 and a lower rectifying diode D2 connected in parallel to the lower switch element S2 with a cathode faced to the upper switch element S1. The first switch circuit 4 is connected to both ends of a battery 9 while the upper switch element S1 is faced to a positive terminal of the battery. An intermediate terminal 4a is led out between the upper and lower switch elements S1 and S2 and connected to at least one of the tap terminals of the first group of the stator 2 (connected to the tap terminal t1, in the illustrated embodiment).

The second switch circuit 5 may be constructed in the same manner as the first switch circuit 4 and an intermediate terminal 5a is connected to at least one of the tap terminals of the second group (connected to the tap terminal t2, in the illustrated embodiment).

Two or more than two of the first and second switch circuits 4 and 5 may alternatively be provided.

The third switch circuits 6 have an upper arm including a series circuit of an upper switch element S1 and an upper charge prevention diode d1 disposed in a forward direction relative to a conduction direction of the upper switch element S1 when it is turned on and a lower arm including a lower switch element S2 and a lower charge prevention diode d2 disposed in a forward direction relative to a conduction direction of the lower switch element S2 when it is turned on and connected in series to the upper arm. The third switch circuit 6 is connected to both ends of the battery 9 while the upper arm of S1 and d1 is placed on the side of a positive terminal of the battery 9. In the third switch circuit 6, an intermediate terminal 6a is led out between the upper arm of S1 and d1 and the lower arm of S2 and d2. The single third switch circuits 6 may be provided. The intermediate terminal 6a thereof is connected to at least one of the tap terminals of the first group of the stator 2. In the illustrated embodiment, the two or double third switch circuits 6 are provided, but the single third switch circuit may be provided. The intermediate terminal 6a of one of the third switch circuits 6 is connected to the tap terminal t3 of the first group of the stator 2 while the intermediate terminal 6a of the other of the third switch circuits 6 is connected to the tap terminal t5 thereof The fourth switch circuit 7 may be constructed in the same manner as the third switch circuit 6. At least one of the fourth switch circuits 7 may be provided. An intermediate terminal 7a thereof is connected to at least one of the tap terminals of the second group to which the intermediate terminal 5a of the second switch circuit 5 is not connected. In the illustrated embodiment, the two or double fourth switch circuits 7 are provided, but the single fourth switch circuit may be provided. The intermediate terminal 7a of one of the fourth switch circuits 7 is connected to the tap terminal t4 while the intermediate terminal 7a of the other of the fourth switch circuits 7 is connected to the tap terminal t6.

In the illustrated embodiment, charge prevention means to prevent a charging current from being supplied from the stator through the third and fourth switch circuits to the battery may comprise the upper and lower charge prevention diodes d1 and d2 of the third switch circuit 6 and the upper and lower charge prevention diodes d1 and d2 of the fourth switch circuit 7.

Although, in the embodiment illustrated in FIG. 1, the switch elements comprise a N-channel type MOSFET, they may be alternatively either of a bipolar-transistor, an IGBT (gate insulating bipolar transistor) and so on.

In case that the switch elements comprise the MOSFET, a parasitic diode formed between a drain and a source thereof may be used for the rectifying diodes D1 and D2.

Although, in the illustrated embodiment, the third and fourth switch circuits 6 and 7 have the rectifying diodes D1 and D2 connected in parallel to the upper and lower switch elements S1 and S2, the rectifying diodes D1 and D2 may be omitted because the switch elements comprise the MOSFET.

In the illustrated embodiment, in order to detect the current flowing from the battery 9 through the coils W1 through W6, a shunt diode R1 may be inserted between the common connection point of the lower switch elements S2 of the first through fourth switch circuits 4 through 7 and the negative terminal of the battery 9.

The switch controller 8 is provided which serves to control the switch elements of the first through fourth switch circuits 4 through 7 in accordance with the output of the rotor magnetic pole sensor 3 in order to rotate the magnet rotor 1 in the rotational direction of the crankshaft by operating the rotary electric machine of FIG. 1 as a motor when the internal combustion engine should start.

The switch controller 8 controls the first through fourth switch circuits 4 through 7 so as to turn on the upper switch elements S1 of the first and third switch circuits 4 and 6 and the lower switch elements S2 of the second and fourth switch circuits 5 and 7 when the rotor magnetic pole sensor 3 detects one such as the N pole, for example and the output Vh of the rotor magnetic pole sensor 3 is at one of the levels and to turn on the upper switch elements S1 of the second and fourth switch circuits 5 and 7 and the lower switch elements S2 of the first and third switch circuits 4 and 6 when the rotor magnetic pole sensor 3 detects the other pole such as the S pole, for example and the output Vh of the rotor magnetic pole sensor 3 is at the other level.

In the illustrated embodiment, the rotor magnetic pole sensor 3 comprises the hole IC and is adapted to output the signal Vh of H level (high level) when the rotor magnetic pole sensor 3 detects the N pole and the signal Vh of L level (low or zero level) when the rotor magnetic pole sensor 3 detects the S pole. Signal distribution circuits 8A and 8B may be provided in the switch controller 8. The output signal Vh of the rotor magnetic pole sensor 3 is input directly to the signal distribution circuit 8A while it is input to the signal distribution circuit 8B after it is inverted by an inverter circuit INV. In the switch controller 8 may be provided a revolution-drive current control circuit 8C to which are input the output signal of the rotor magnetic pole sensor 3 and the voltage across the shunt resistor R1.

The signal distribution circuit 8A provides the drive signals A, C and E of H level that should be applied to the upper switch elements S1 of the first switch circuit 4 connected to the tap terminal t1, the third switch circuit 6 connected to the tap terminal t3 and the third switch circuit 6 connected to the tap terminal t5, respectively when the rotor magnetic pole sensor 3 detects the N pole and outputs the signal Vh of H level to turn on the switch elements S1 of these switch circuits. At that time, the signal distribution circuit 8B provides the drive signals B, D and F of H level that should be applied to the lower switch elements S2 of the switch circuits 5, 7 and 7 connected to the tap terminals t2, t4 and t6, respectively to maintain the on-state (the turned-on state) of the lower switch elements S2 of these switch circuits.

When the rotor magnetic pole sensor 3 detects the N pole of the magnet rotor and outputs the signal Vh of H level, the signal distribution circuit 8A provides the drive signals B', D' and F' of L level that should be applied to the upper switch elements S1 of the switch circuits 5, 7 and 7 connected to the tap terminals t2, t4 and t6, respectively to maintain the off-state (the turned-off state) of the switch elements S1 of these switch circuits.

When the rotor magnetic pole sensor 3 detects the S pole and outputs the signal Vh of L level, the signal distribution circuit 8A provides the drive signals B', D' and F' of H level that should be applied to the upper switch elements S1 of the switch circuits 5, 7 and 7 connected to the tap terminals t2, t4 and t6, respectively to maintain the on-state of the switch elements S1 of these switch circuits and provides the drive signals A, C and E of L level that should be applied to the upper switch elements S1 of the switch circuits 4, 6 and 6 connected to the tap terminals t1, t3 and t5, respectively to maintain the off-state of the switch elements Si of these switch circuits.

Also, when the rotor magnetic pole sensor 3 detects the S pole and outputs the signal Vh of L level, the signal distribution circuit 8B provides the drive signals A', C' and E' of H level that should be applied to the lower switch elements S2 of the switch circuits 4, 6 and 6 connected to the tap terminals t1, t3 and t5, respectively to maintain the on-state of the switch elements S2 of these switch circuits and provides the drive signals B, D and F of L level that should be applied to the lower switch elements S2 of the switch circuits 5, 7 and 7 connected to the tap terminals t2, t4 and t6, respectively to maintain the off-state of the switch elements S2 of these switch circuits.

The revolution-drive current control circuit 8C serves to arithmetically operate the revolution of the motor on an output frequency of the rotor magnetic pole sensor 3 and apply a drive stop instruction signal to the signal distribution circuits 8A and 8B when the obtained revolution reaches the set revolution set be slightly higher than the engine start completing revolution, but slightly lower than the idling revolution so as to provide all the drive signals of L level output from the signal distribution circuits 8A and 8B whereby the drive current stops being supplied to the coils W1 through W6.

The revolution-drive current control circuit 8C also provides the drive stop instruction signals to the signal distribution circuits 8A and 8B when the drive current detected on the voltage across the shunt resistance R1 exceeds a limit value to provide all the drive signal of L level output from the signal distribution circuits 8A and 8B. Thus, the drive current stops being supplied to the coils W1 through W6, which prevents an over current from flowing through the coils.

In the starter generator of FIGS. 1 and 2, a single phase full-wave rectifier circuit for rectifying a voltage induced by the one coil W2 among the coils W1 through W6 is formed by the rectifying diodes D1 and D2 of the first switch circuit 4 and the rectifying diodes D1 and D2 of the second switch circuit 5. A charging current is supplied from the rectifier circuit to the battery when a voltage obtained between the DC output terminals of the rectifier circuit exceeds the terminal voltage of the battery 9.

In the starter generator of FIGS. 1 and 2, the condition in which the current flows from the battery 9 to the coils through the tap terminals t1, t3 and t5 of the first group of the stator 2 and the condition in which the current flows from the battery 9 to the coils through the tap terminals t2, t4 and t6 of the first group of the stator 2 are alternately switched whenever the polarity of the magnetic pole detected by the rotor magnetic pole sensor 3 changes whereby the magnet rotor 1 rotates in the rotational direction of the internal combustion engine.

Figure 3:
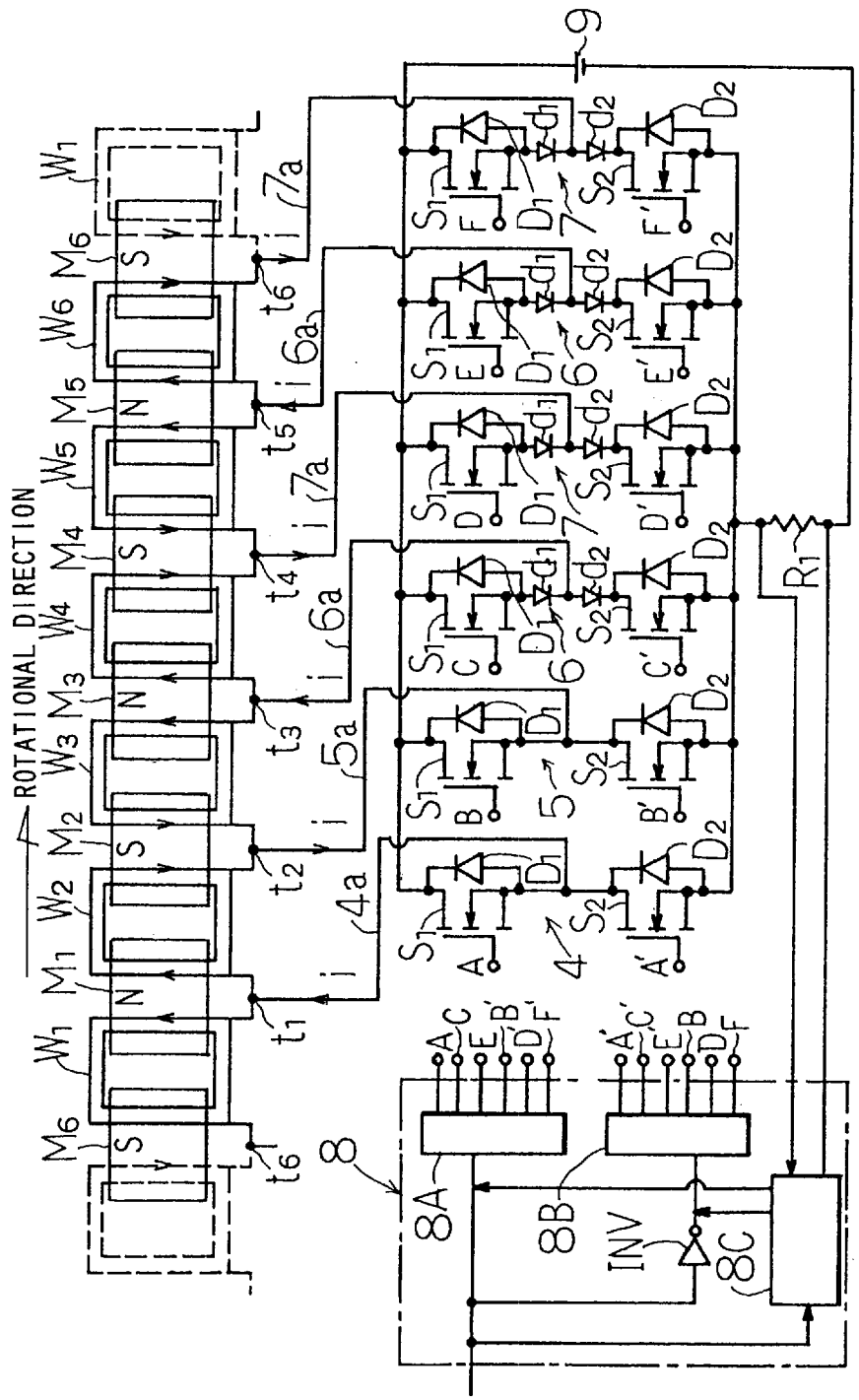
FIG. 3 is a circuit diagram of the drive circuit in the condition in which the starter generator of FIGS. 1 and 2 is operated as the starter motor.

FIG. 3 illustrates the condition of the drive circuit when the rotor magnetic pole sensor 3 outputs the signal of H level. When the rotor magnetic pole sensor 3 outputs the signal of H level, the upper switch elements S1 of the first and third switch circuits 4, 6 and 6 connected to the tap terminals t1, t3 and t5, respectively are turned on and the lower switch elements S2 of the second and fourth switch circuits 5, 7 and 7 connected to the tap terminals t2, t4 and t6, respectively are turned on. At that time, a current i flows from the battery 9 through the upper switch element S1 of the first switch circuit 4 and the intermediate terminal 4a and divided through the tap terminal t1 into the coils W1 and W2.

The current introduced into the coil W1 is fed back from the tap terminal t6 to the battery 9 through the lower switch element S2 of the fourth switch circuit 7 while the current introduced into the coil W2 is fed back from the tap terminal t2 to the battery 9 through the lower switch element S2 of the second switch circuit 5.

The current i flows from the battery 9 to the tap terminal t3 through the upper switch element S1, the diode d1 and the intermediate terminal 6a of the third switch circuit 6 connected to the tap terminal t3 and divided into the coils W3 and W4. The current introduced into the coil W3 is fed back from the tap terminal t2 to the battery 9 through the lower switch element S2 of the second switch circuit 5 while the current introduced into the coil W4 is fed back from the tap terminal t4 to the battery 9 through the lower switch element S2 of the second switch circuit 7.

Furthermore, the current i flows from the battery 9 to the tap terminal t5 through the upper switch element S1, the diode d1 and the intermediate terminal 6a of the third switch circuit 6 connected to the tap terminal t5 and divided into the coils W5 and W6. The current introduced into the coil W5 is fed back from the tap terminal t4 to the battery 9 through the lower switch element S2 of the fourth switch circuit 7 while the current introduced into the coil W6 is fed back from the tap terminal t6 to the battery 9 through the lower switch element S2 of the fourth switch circuit 7.

As the current flows through the coils as aforementioned, the magnet rotor 1 rotates and as the ignition system not shown operates, the internal combustion engine starts. The revolution-drive current control circuit 8C arithmetically operates the revolution of the motor on the output frequency of the rotor magnetic pole sensor 3 and stops supplying the drive signal applied to the first through fourth switch circuits 4 through 7 when the obtained revolution reaches the set revolution slightly lower than the idling revolution. This causes the switch elements S1 and S2 of the first through fourth switch circuits to be turned off and therefore the rotary electric machine stops the operation as the motor. Thus, the revolution of the internal combustion engine falls into the idling revolution.

Figure 4:
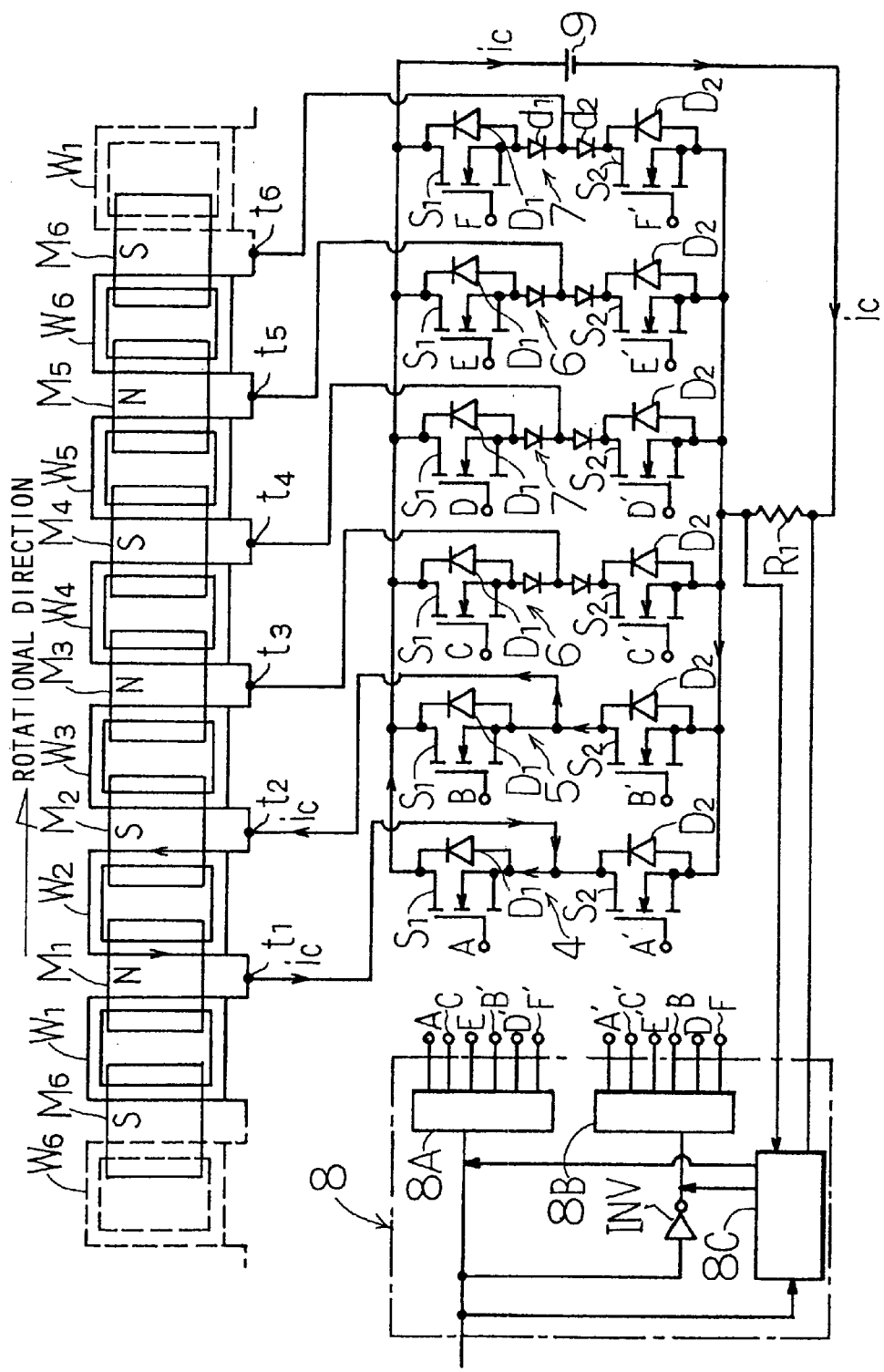
FIG. 4 is a circuit diagram of the drive circuit relation in the condition in which the starter generator of FIGS. 1 and 2 is operated as the generator.

As the revolution of the internal combustion engine exceeds the idling revolution, the charging current 1c is supplied from the generator coil W2 to the battery 9 through the rectifier circuit formed of the rectifying diodes D1 and D2 of the first and second switch circuits 4 and 6. This condition is shown in FIG. 4. In the condition of FIG. 4, the switch controller 8 is stopping the supply of the drive signal for all the switch elements of the first through fourth switch circuits 4 through 7 and therefore the switch elements S1 and S2 of all the switch circuits are kept turned off.

Figure 5A:
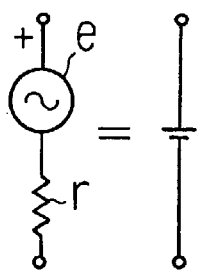
FIG. 5A illustrates the respective coils replaced by a cell battery for expressing a circuit equivalent to the circuit of FIG. 4.
Figure 5B:
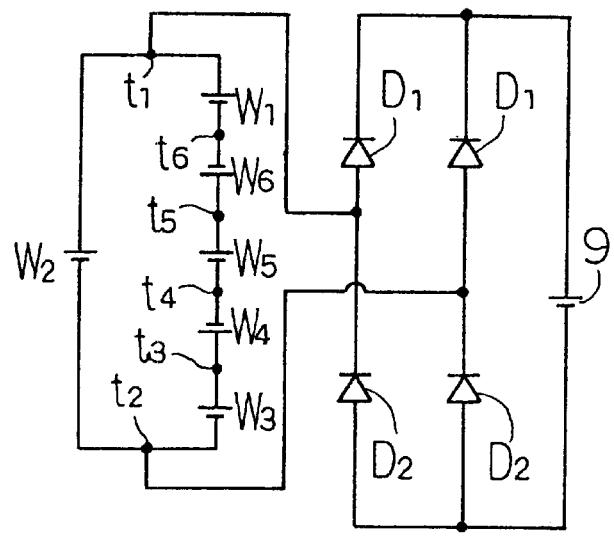
FIG. 5B is a circuit diagram illustrating the circuit equivalent to the circuit of FIG. 4.

With the respective coils expressed by an AC power supply source e and an internal resistance r of the coils and equivalently expressed by a single battery as shown in FIG. 5A, an equivalent circuit illustrating the relation between the coil W2 and the other coils W1, W3 through W6 in the condition of FIG. 4 is indicated in FIG. 5B. Since the coils other than the coil W2 are alternately disposed so that the phase of the adjacent coils is different by 180 degree from each other as shown in FIG. 5B, the voltage obtained across the series circuit of the coils W1, W3 through W6 gets identical to the voltage across the coil W2 and therefore the balance of the voltage is never broken. In the equivalent circuit of FIG. 5B, since the internal resistance of the circuit of the single coil W2 is smaller than that of the series circuit of the coils W1, W3 through W6, the charging current will be determined substantially on the coil W2. Accordingly, since the charging current for the battery is substantially equal to the output current of the coil W2, the load involving semiconductor elements can decrease and therefore the battery is prevented from being possibly broken, which will tend to occur due to an over charging current flowing through the battery when the internal combustion engine rotates at middle or high speed.

When the voltage across the battery 9 exceeds the set value after the battery is fully charged, the battery stops being charged by shorting the generator coil W2, which is caused by simultaneously turning on the lower switch elements S2 of the first and second switch circuits 4 and 5 while the upper switch elements S1 of these switch circuits are kept turned off. Since the short current flowing through the lower switch elements S2 of the first and second switch circuits 4 and 5 corresponds to that for one coil, no over load is applied to the switch elements S2.

An example of a time chart illustrating a relation among the revolution of the internal combustion engine with the starter generator of FIGS. 1 and 2, a voltage across the battery charged by the starter generator and the control operation of the switch circuits is shown in FIG. 6.

FIG. 6A indicates variation in the revolution of the internal combustion engine relative to time. In this example, it is supposed that the engine restarts because it fails to be ignited after it starts. In this figure, N1 indicates the idling revolution and N2 indicates the set revolution for confirming the completion of the engine start.

FIG. 6B indicates an over current detection signal obtained by an over current detection circuit not shown when a current detected by the voltage appearing across the shunt resistance R1 exceeds the limit value and FIG. 6C indicates variation in the terminal voltage of the battery 9 relative to time.

FIG. 6D indicates the output signal Vh of the rotor magnetic pole sensor 3 and FIGS. 6E through 6H indicate the drive signals (A, C, E), (A', C', E'), (B, D, F) and (B', D', F') output by the switch controller 8, respectively.

In the example shown in FIG. 6, a not shown key switch is at the onstate at time. To in order to start the engine. As the key switch is turned on, the drive signals (A, C, E), (A', C', E'), (B, D, F) and (B', D', F') shown in FIGS. 6E through 6H are applied from the switch controller 8 to the switch elements of the switch circuits 4 through 7 in accordance with the level of the output of the rotor magnetic pole sensor 3. In the shown example, since the output of the rotor magnetic pole sensor 3 is at H level immediately after the key switch is turned on at the time To, the drive signals (A, C, E) and (B', D', F') are made H level and therefore the upper switch elements S1 of the switch circuit 4, the switch circuit 6 connected to the tap terminal t3 and the switch circuit 6 connected to the tap terminal t5 and the lower switch elements S2 of the second switch circuit 5, the switch circuit 7 connected to the tap terminal t4 and the switch circuit 7 connected to the tap terminal t6 are turned on. This causes the great drive current to flow from the battery 9 through the coils W1 through W6 and the voltage across the battery 9 to be lowered. As the drive current flowing through the coils W1 through W6 exceeds the limit value, the over current detection signal shown in FIG. 6B is produced. Thus, since the revolution-drive current control circuit 8C provides the drive signals (B', D', F') of L level, the switch elements S2 of the switch circuits to which these drive signals are applied are turned off. Therefore, the over current detection signal disappears and the drive signal (B', D', F') are generated again. In this manner, when the engine should start, every time the drive current flowing through the coils W1 through W6 exceeds the limit value, the lower switch elements of the switch circuits are turned off. Thus, it will be noted that the drive current intermittently flows through the coils W1 through W6.

Since the load on the motor gets lighter after the revolution of the engine increases at certain degree, the current flowing through the coils W1 through W6 is not beyond the limit value and therefore the over current detection signal is no longer generated. In the example of FIG. 6, the engine fails to be ignited at time T1 due to any trouble after the revolution exceeds the idling revolution so that the revolution decreases and the restart operation of the engine is made when the revolution is lowered until it reaches the set value N2 at time T2.

After the restart operation of the engine is made at time T2, the revolution of the engine exceeds the idling revolution N1 at time T3 and the battery 9 starts to be charged. As the terminal voltage of the battery 9 exceeds the set value at time T4, the lower switch elements S2 of the first and second switch circuits 4 and 5 are simultaneously turned on so that the coil W2 is shorted. This short circuit of the coil W2 causes the battery 9 to stop being charged and therefore the terminal voltage of the battery 9 gets lowered. As the terminal voltage of the battery 9 is equal to or less than the set value at time T5, the lower switch elements S2 of the first and second switch circuits 4 and 5 are at the off-state so that the battery 9 restarts to be charged.

Figure 7:
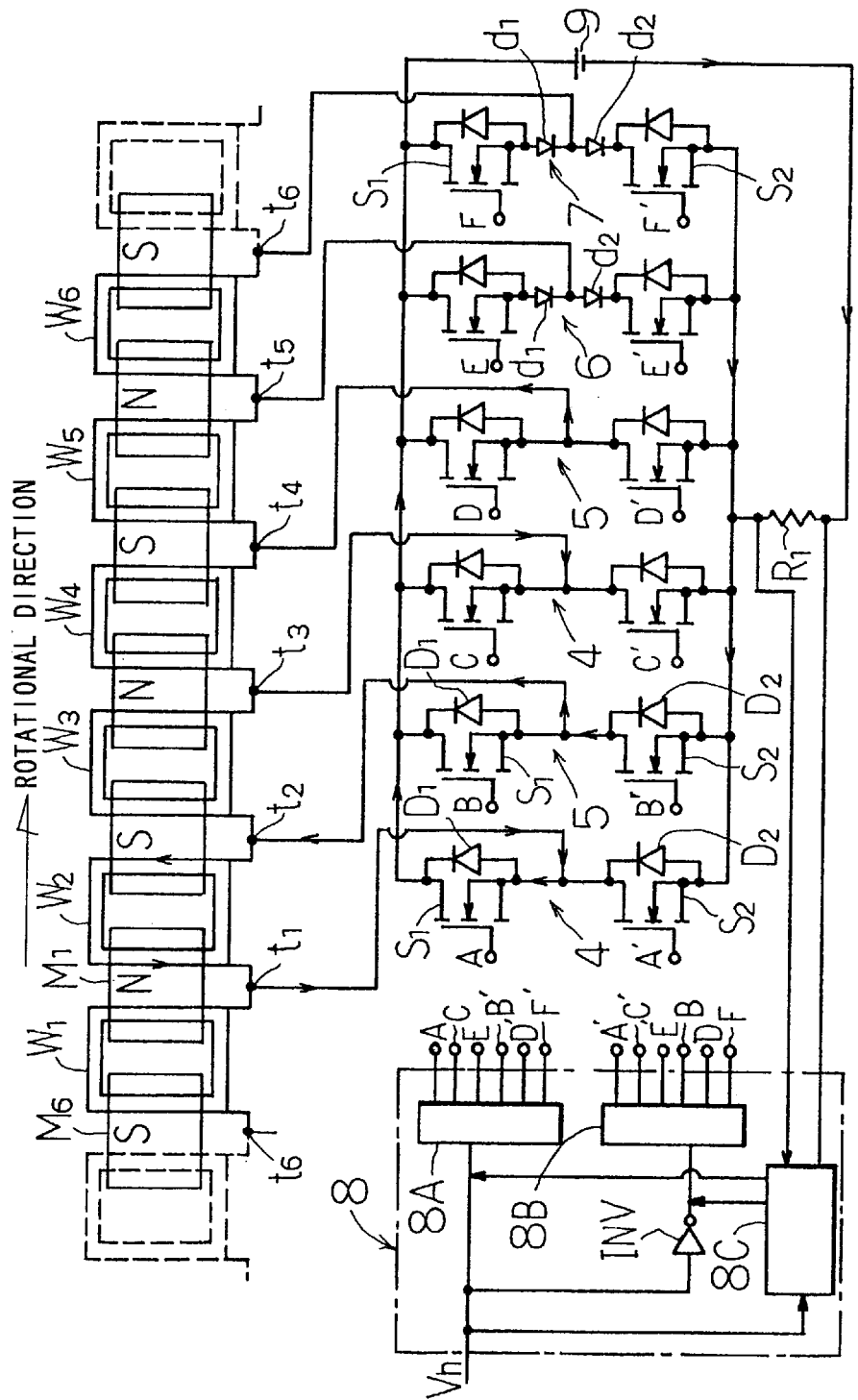
FIG. 7 is a circuit diagram of another embodiment of the drive circuit for the starter generator of FIGS. 1 and 2 in which the number of the charge prevention diodes decreases.

In case that the battery is charged by the circuits of FIG. 4, if the battery is short of the charging current, then the single third switch circuit 6 and the single fourth switch circuit 7, both of which have the charge prevention diodes d1 and d2 inserted, may be provided as shown in FIG. 7 and the respective intermediate terminals thereof are connected to the tap terminals t5 and t6, respectively while the intermediate terminals of the two first switch circuits 4 and the two second switch circuits 5 are connected to the remaining tap terminals t1 through t4, respectively.

Figure 8:
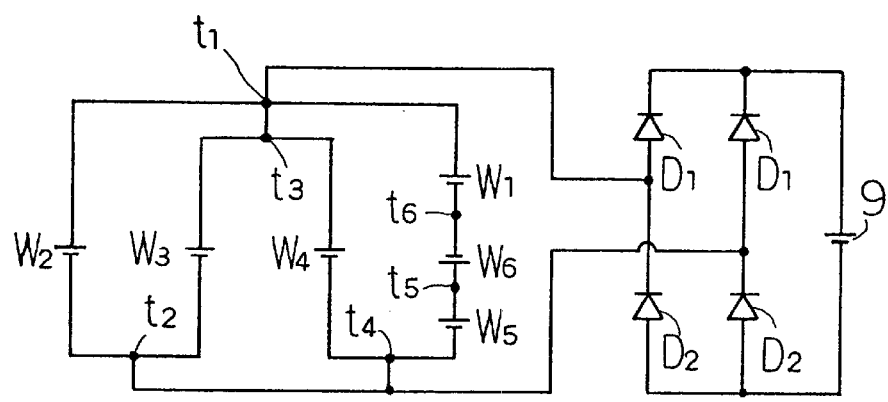
FIG. 8 is a circuit diagram of a circuit equivalent to the circuit of FIG. 7.

The circuit equivalent to the circuit of FIG. 7 is as indicated in FIG. 8. The charging current is determined substantially on the three coils W2, W3 and W4 and the charging current approximately three times as much as one flowing through the battery in the embodiment of FIG. 1 can flow. Also, since, in the circuit of FIG. 7, three rectifier circuits of the rectifier circuit formed by the rectifying diodes for the switch circuits 4 and 5 connected to the tap terminals t1 and t2, respectively, the rectifier circuit formed by the rectifying diodes for the switch circuits 5 and 4 connected to the tap terminals t2 and t3, respectively and the rectifier circuit formed by the rectifying diodes for the switch circuits 4 and 5 connected to the tap terminals t3 and t4, respectively correspond to the three coils W2, W3 and W4, respectively, the load against the respective diodes forming the rectifier circuits will just slightly increase.

Figure 9:
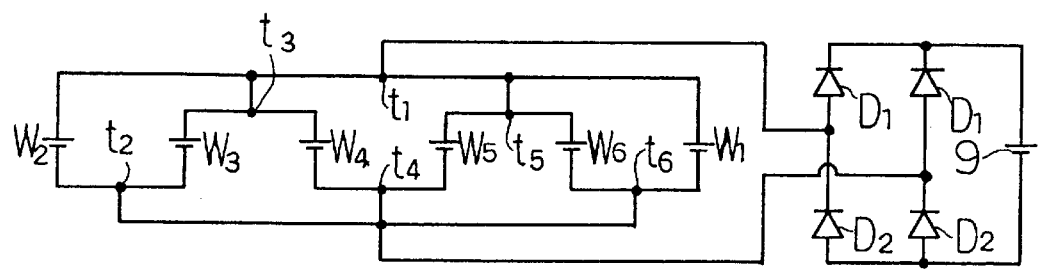
FIG. 9 is a circuit diagram of a circuit similar to the equivalent circuit of FIG. 7 except that all the charge prevention diodes are omitted therefrom.
Figure 10:
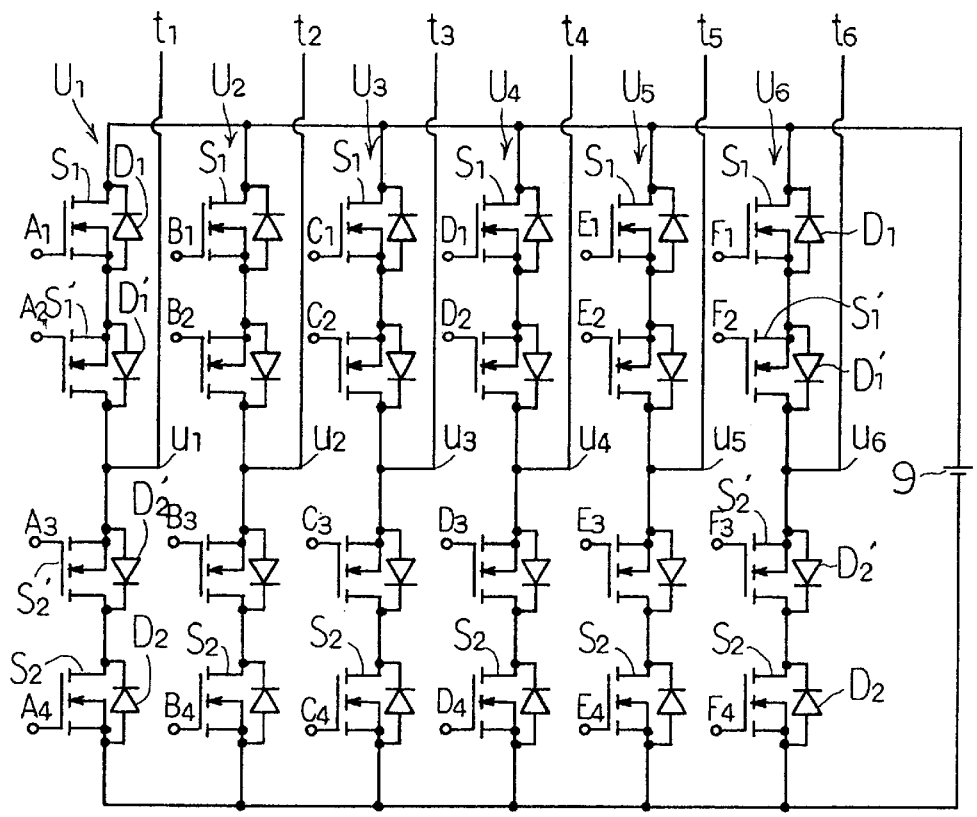
FIG. 10 is a circuit diagram of switch circuits in another form that can be used for the invention.

If all the switch circuits comprise one identical to the first or second switch circuit 4 or 5 with the charge prevention diodes removed from the circuitry of FIG. 7, the equivalent circuit will be as expressed in FIG. 9 and the charging current six times as much as the one in FIG. 1 can flow. FIG. 10 illustrates an embodiment in which the battery charging current can vary with a wide range by using variation in the charging current by changing the number of the switch circuits that can prevent the output current.

In the embodiment of FIG. 10, the switch circuits U1 through U6 having the identical construction are provided corresponding to the tap terminals t1 through t6.

The respective switch circuits U1 through U6 comprise an upper arm and a lower arm connected in series to the upper arm. The respective intermediate terminals led out between the upper and lower arms of the respective switch circuits U1 through U6 are connected to the tap terminals t1 through t6, respectively.

The switch circuits U1 through U6 are connected in parallel to both ends of the battery 9 with the upper arms of the respective switch circuits U1 through U6 disposed on the side of the positive terminal of the battery 9.

The upper arm of the respective switch circuits comprise an upper main switch element S1 allowing the conduction of the current from the battery 9 when it is turned on, an upper control switch element S1' connected in series to the upper main switch element S1 so that the upper control switch element S1' is directed in a direction reverse to the direction in which the current through the upper main switch element flows when it is turned on, an upper rectifying diode D1 connected in parallel to the upper main switch S1 so that the rectifying diode D1 is directed in a direction reverse to the conduction direction of the main switch element S1 when it is turned on and an upper bypassing diode D1' connected in parallel to the upper control switch element S1' so that the bypassing diode D1' is directed in a direction reverse to the conduction direction of the upper control switch element S1' when it is turned on.

The lower arm of the respective switch circuits comprise a lower main switch element S2 allowing the current to be fed back to the battery 9 when it is turned on, a lower control switch element S2' connected in series to the lower main switch element S2 so that the lower control switch element S2' is directed in a direction reverse to the conduction direction of the lower main switch element S2 when it is turned on, a lower rectifying diode D2 connected in parallel to the lower main switch S2 so that the rectifying diode D2 is directed in a direction reverse to the conduction direction of the lower main switch element S2 when it is turned on and a lower bypassing diode D2' connected in parallel to the lower control switch element S2' so that the lower bypassing diode D2' is directed in a direction reverse to the conduction direction of the lower control switch element S2' when it is turned on.

The upper main switch elements S1 shown may comprise a MOSFET having a drain connected to the positive terminal of the battery 9 and the upper control switch elements S1' may comprise a MOSFET having a source connected to the source of the MOSFET forming the main switch elements S1.

The lower main switch elements S2 may comprise a MOSFET having a source connected to the negative terminal of the battery 9 and the lower control switch elements S2' may comprise a MOSFET having a drain connected to the drain of the MOSFET forming the main switch elements S2 and a source connected to the drain of the MOSFET forming the upper control switch elements S1'.

The switch circuits U1 through U6 have respective intermediate terminals u1 through u6 led out from connection points between the drain of the MOSFET forming the upper control switch elements S1' and the source of the MOSFET forming the lower control switch elements S2' that are connection points between the upper and lower arms. The intermediate terminals u1 through u6 are connected to the corresponding tap terminals t1 through t6, respectively.

There is provided a switch controller not shown that controls the aforementioned switch circuits U1 through U6. Drive signals A1 through F1 and A2 through F2 are applied from the switch controller to the switch elements S1 and S1' of the switch circuits U1 through U6, respectively. Also, the switch controller applies drive signals A3 through F3 and A4 through F4 to the switch elements S2 and S2' of the switch circuits U1 through U6, respectively.

When the engine should start, the switch controller controls the switch circuits U1 through U6 so as to turn on the upper main switch elements S1 of the switch circuits U1, U3 and U5 having the intermediate terminals connected to the tap terminals t1, t3 and t5 of the first group and the lower main switch elements S2 of the switch circuits U2, U4 and U6 having the intermediate terminals connected to the tap terminals t2, t4 and t6 of the second group when the output of the rotor magnetic pole sensor is at one of the H and L levels (at the H level) and to turn on the upper main switch elements S1 of the switch circuits U2, U4 and U6 having the intermediate terminals connected to the tap terminals t2, t4 and t6 of the second group and the lower main switch elements of the switch circuits U1, U3 and U6 having the intermediate terminals connected to the tap terminals t1, t3 and t5 of the first group when the output of the rotor magnetic pole sensor is at the other level whereby the magnet rotor rotates in the rotational direction of the crankshaft. Also, after the engine starts, the switch controller controls the switch circuits U1 through U6 so as to maintain the off-state of both of the upper and lower main switch elements S1 and S2 of the respective switch circuits, to maintain the off-state of the upper and lower control switch elements S1' and S2' of the predetermined switch circuits selected in accordance with an objective value of the charging current of the battery 9 and to maintain the on-state of the upper and lower control switch elements S1' and S2' of the other switch circuits at the turned-on state.

Figure 11:
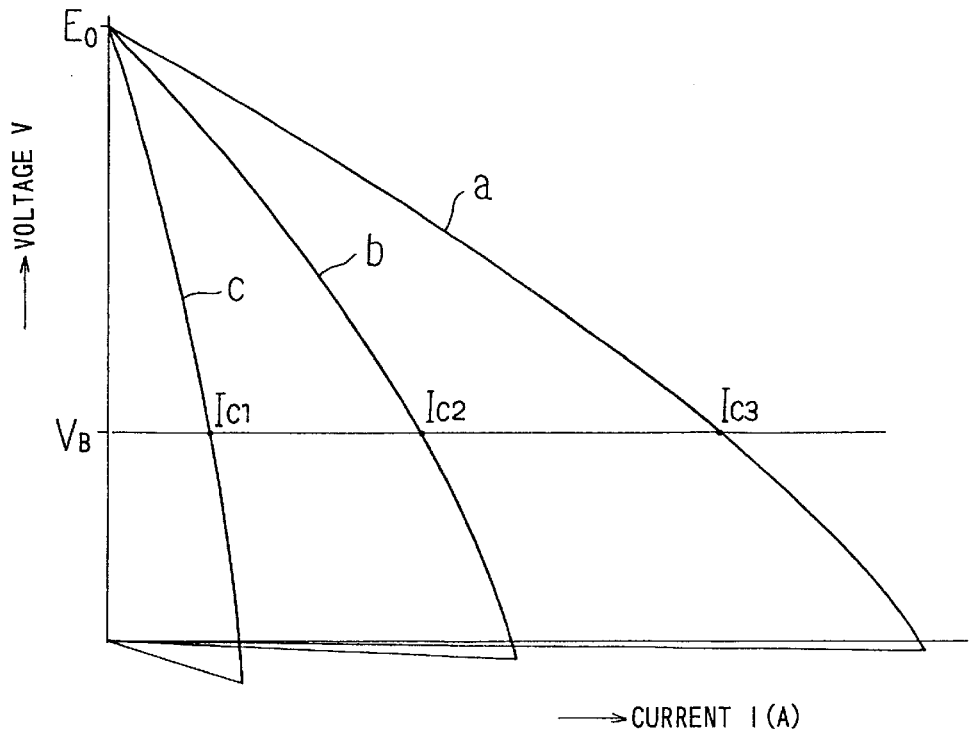
FIG. 11 shows curves illustrating characteristics of output current to output voltage of the generator provided in case that the switch circuits of FIG. 10 are used.

In the circuit of FIG. 10, when the starter generator is operated as the generator after the engine starts, with all of the control switch elements S1' and S2' of the switch circuits U1 through U6 kept at the on-state, the characteristic of the output current I to the output voltage V is as indicated by a curve a of FIG. 11 and the charging current flowing through the battery 9 having the terminal voltage of VB is indicated by Ic3 of FIG. 11.

On the other hand, with the control switch elements S1' and S2' of the switch circuits U5 and U6 kept at the off-state, the charging current decreases to Ic2 as indicated by a curve b of FIG. 11. Furthermore, with the control switch elements S1' and S2' of the switch circuits U3 through U6 kept at the off-state, the charging current is lowered to Ic1 as indicated by a curve c.

With the construction shown in FIG. 10, it will be noted that the charging current can vary in an appropriate manner by selectively turning on the control switch elements S1' and S2' of the switch circuits U1 through U6 after the engine starts.

Figure 12:
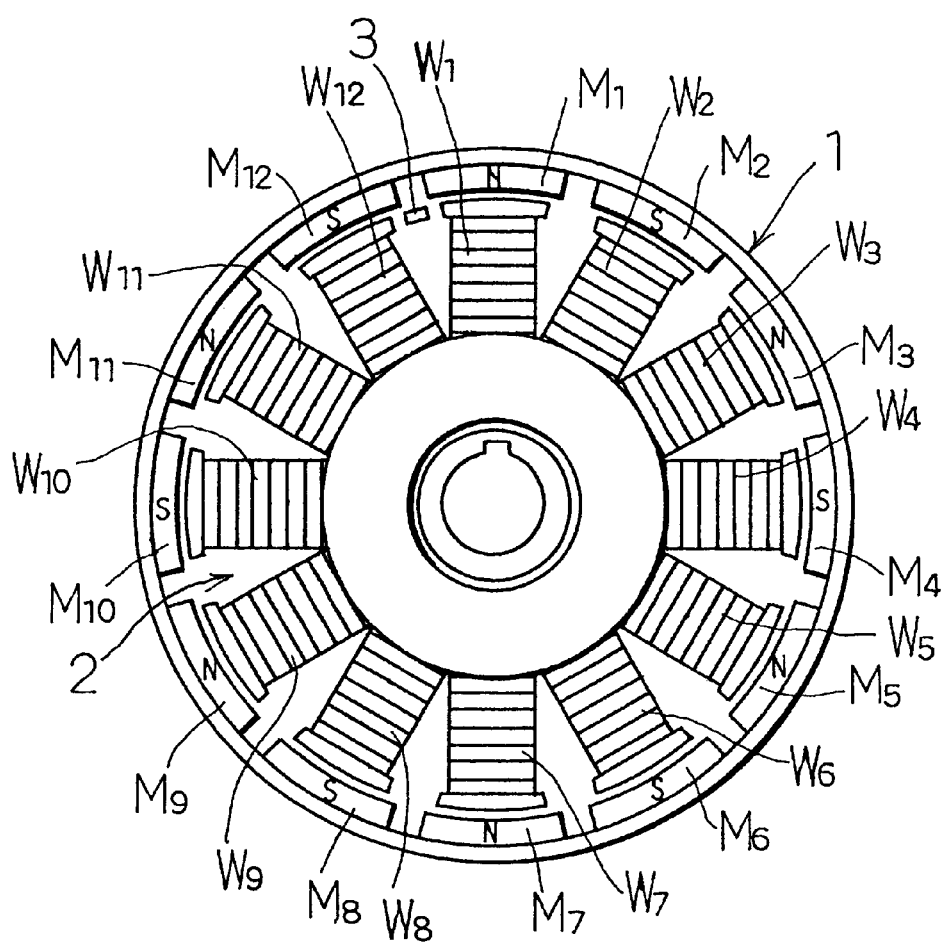
FIG. 12 is a front view of a mechanical portion of a starter generator constructed in accordance with another embodiment of the invention.
Figure 13:
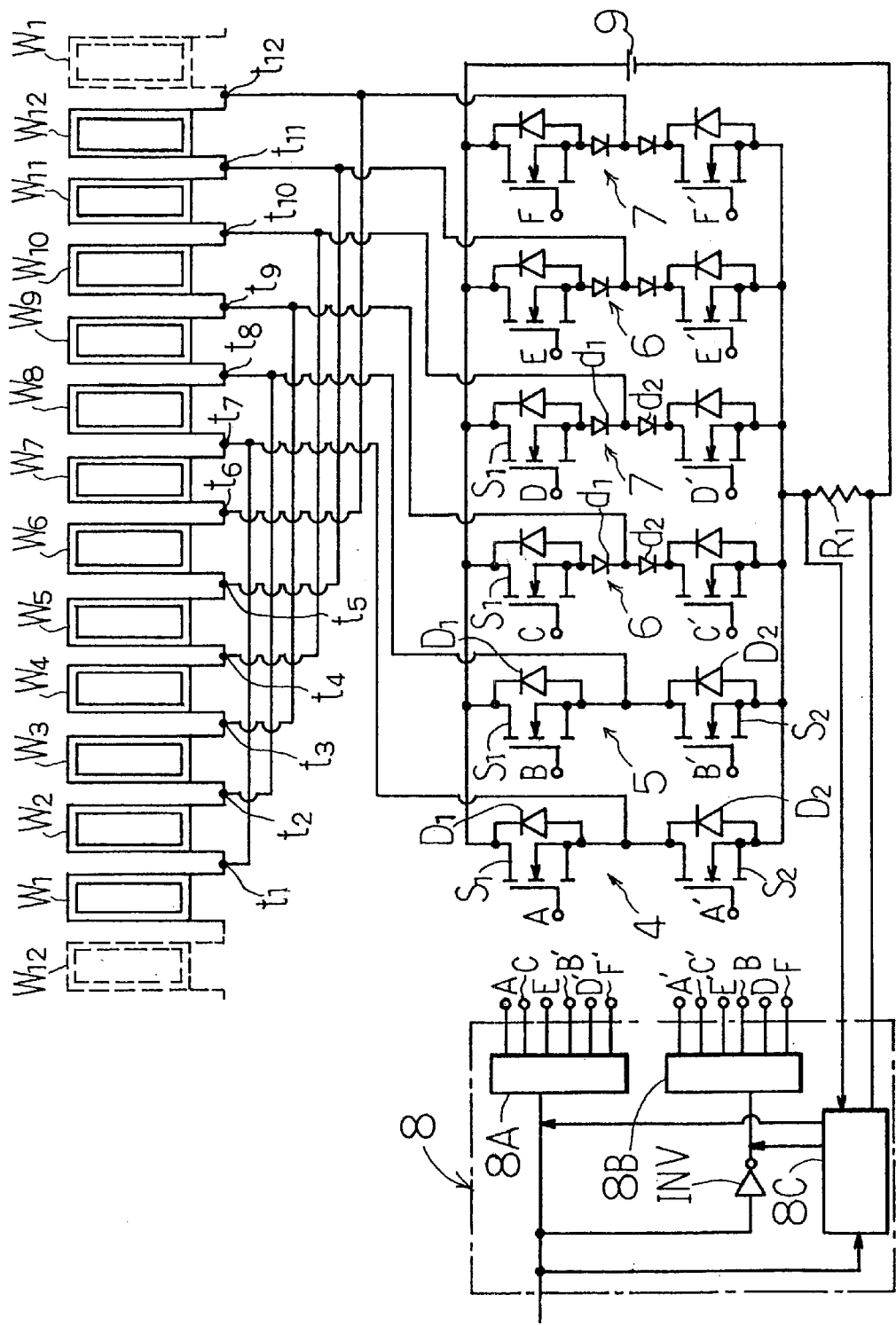
FIG. 13 is a circuit diagram of an embodiment of a drive circuit used for the starter generator of FIG. 12.

With the construction shown in FIG. 1, since the charging current flows partially through the coil W2, a bias load is applied to the rotor due to armature reaction, but with the pole number of the magnet rotor 1 and the stator 2 being twice as many as the conventional magnet rotor and stator so that they have 12 poles as shown in FIG. 12 and with the two tap terminals connected to the coils of the same phase which are located at the position away by a mechanical angle of 180 degree from each other that are the tap terminals t1 and t7, t2 and t8, t3 and t9, t4 and t10, t5 and t11 and t6 and t12 being connected to each other, as the starter generator is operated as the generator after the engine starts as shown in FIG. 13, the charging current flows through the coils W2 and W8 located at the symmetrical position away by the angle of 180 degree and therefore the bias load can be prevented from being applied to the rotor.

Figure 14B:
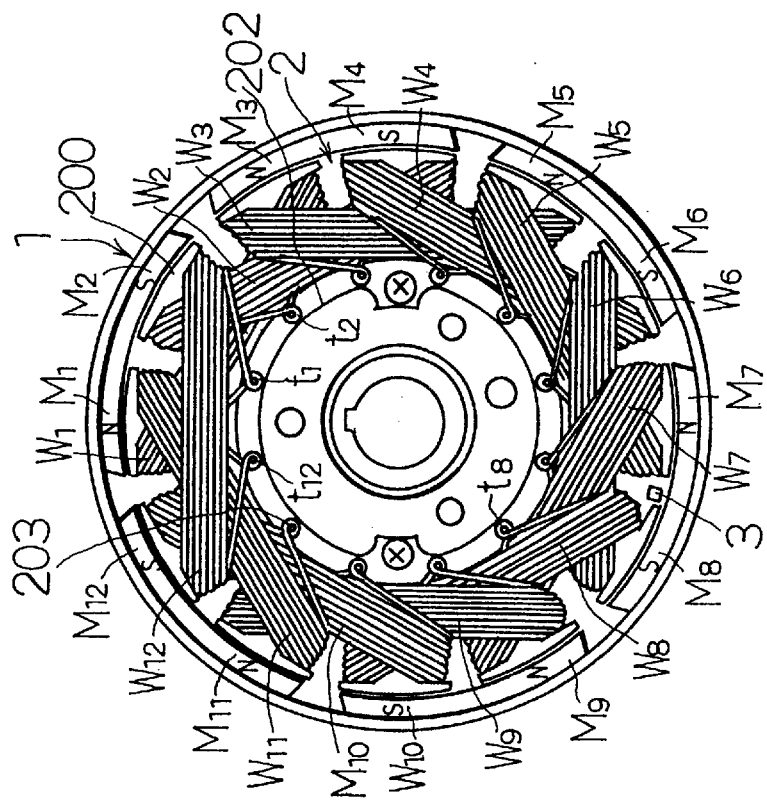
FIG. 14B is a front view of the starter generator of FIG. 14A.
Figure 14A:
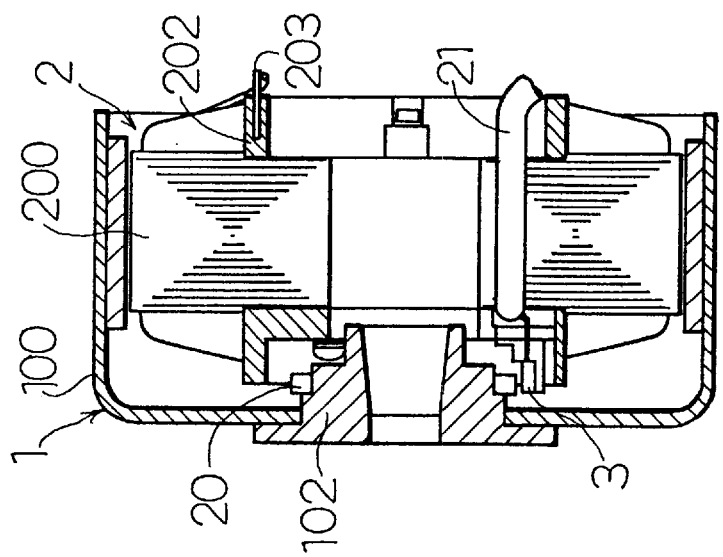
FIG. 14A is a vertical cross sectional view of a starter generator constructed accordance with a further embodiment of the invention.
Figure 15:
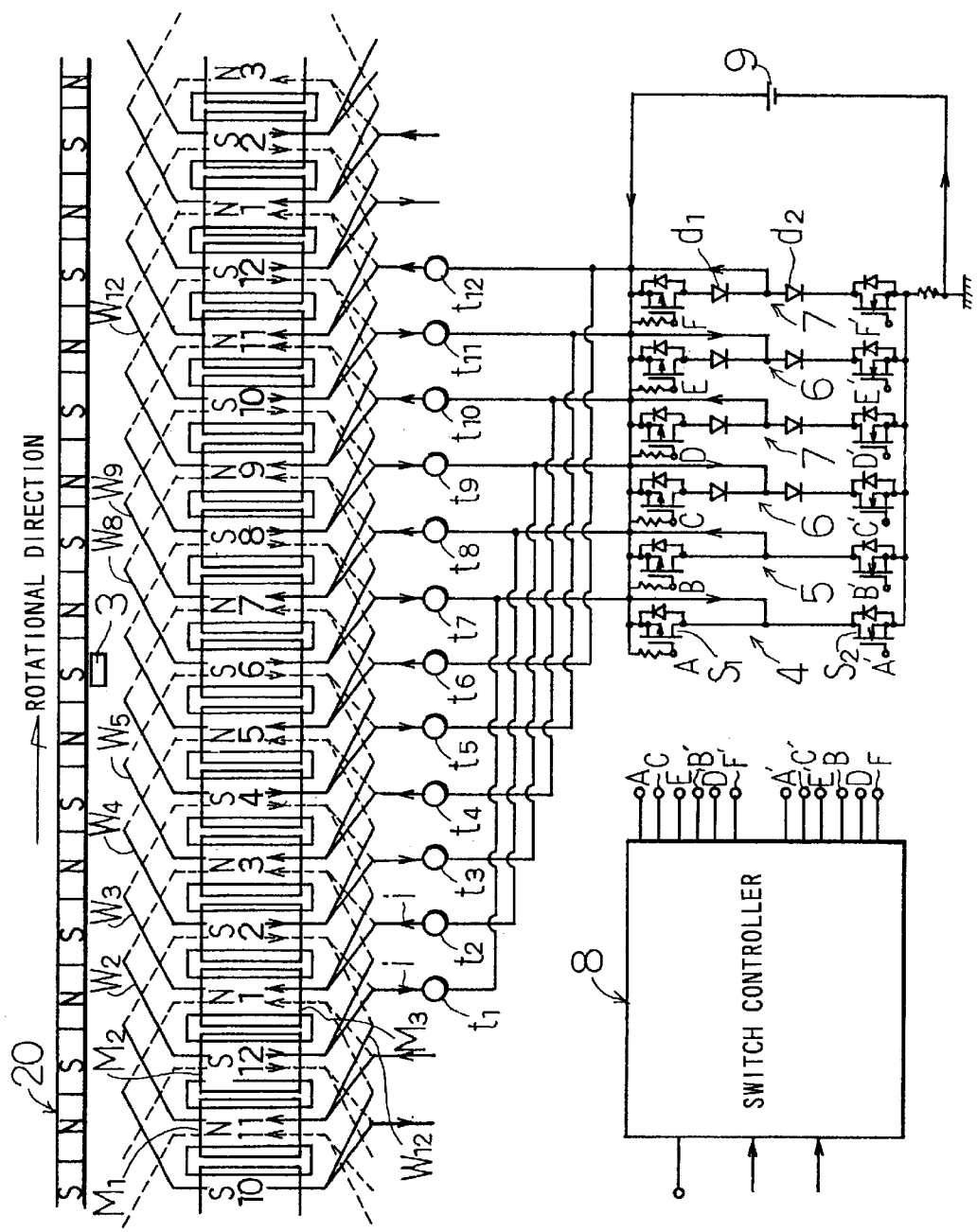
FIG. 15 is a circuit diagram of an embodiment of a drive circuit used for the starter generator of FIG. 14.

FIGS. 14 and 15 show another embodiment of the starter generator of the invention and the coils thereof are shown in a developed manner in FIG. 15. In this embodiment, the rotor 1 has twelve poles while the armature core 200 has twelve slots provided therein. The coils W1 through W12 are wound on the armature core 200 along the three slots in a distributed or superposed manner. In FIG. 14B, a series of slots have a slot number of Nos. 1 through 12 assigned thereto. The coils W1 through W12 are sequentially wound on the armature core at the portions between the adjacent slots while the winding directions of them are identical to each other and connected in series to each other so as to form a closed circuit. Jumper portions corresponding to connection portions of the terminating ends of the respective coils W1 through W12 and the beginning ends of the coils adjacent thereto are wound on pins 203 secured to the a frame of insulating resin 202 that is in turn secured to the armature core 200 with base portions of the pins embedded in the frame 202. The tap terminals t1 through t12 are led out from these pins 203. The intermediate terminals of the switch circuits 4 through 7 are connected to the tap terminals. The constructions of the switch circuits and the switch controller 8 may be identical to those of the embodiment of FIG. 13 except that a P-channel type MOSFET is used as the upper switch elements of the respective switch circuits.

Also, in this embodiment, a ring-like position detection magnet 20 that is magnetized in the same manner as the magnet poles of the magnet rotor may be mounted on the outer periphery of the flywheel 100 for the rotor and the rotor magnetic pole sensor 3 is provided so as to detect the magnetic poles of the magnet 20. The illustrated rotor magnetic pole sensor 3 is disposed at the position corresponding to the No. 6 slot that is between the adjacent coils W5 and W8. An output lead of the rotor magnetic pole sensor 3 is led outside through a wireharness 21 and connected to the switch controller 8.

FIG. 15 illustrates the condition in which the current i flows when the starter generator is operated as the starter motor. In this embodiment, the coil sides of the respective coils through which the armature current i flows and the magnetic poles of the magnet rotor correspond to each other in the ratio of 1 to 1 so that a torque is effectively produced.

Figure 16:
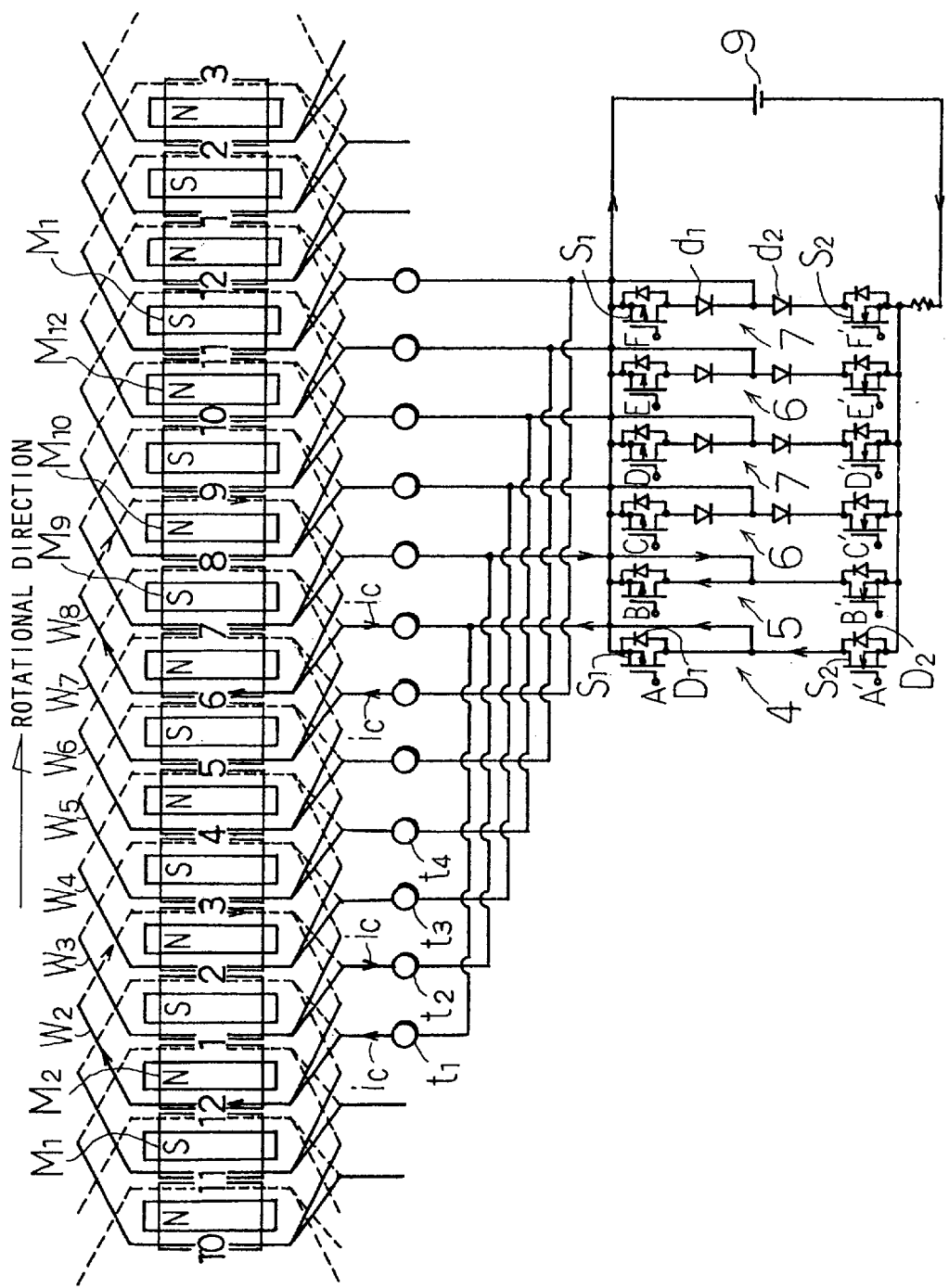
FIG. 16 is a circuit diagram of another embodiment of the drive circuit used for the starter generator of FIG. 14.

FIG. 16 illustrates the condition in which the charging current ic flows when the electric rotary machine of FIG. 14 is operated as the generator. The charging current ic flows through the coils W2 and W8 that are located at the symmetrical position away by the angle of 180 degree from each other.

In this electric rotary machine, since the respective windings are wound along the three slots, the three magnetic poles such as N, S and N poles are present within the respective coils and thus they are disposed so that magnetic fluxes flowing through the pair of the magnetic poles for the respective coils are negated. Therefore, the magnetic flux intercrossing the respective windings corresponds to that of the single magnetic pole. With the coils wound in the distributed manner, the balance of load when the battery is charged can be improved even though the coils from which the charging current is taken out are limited so that the output voltage when the engine is idling is equal to the battery voltage.

Although, in the embodiment of FIG. 14, the coils are wound along the three slots, they may be wound along the five slots. With the coils wound along the five slots, the pole number working when the starter generator is operated as the starter motor increases, but the voltage generated by the rotary machine when it is operated as the generator is similar to that generated by the rotary machine having the coils wound on the single pole. This is effective in case that there is a large difference between the starter motor characteristic and the generator characteristic.

Figure 17:
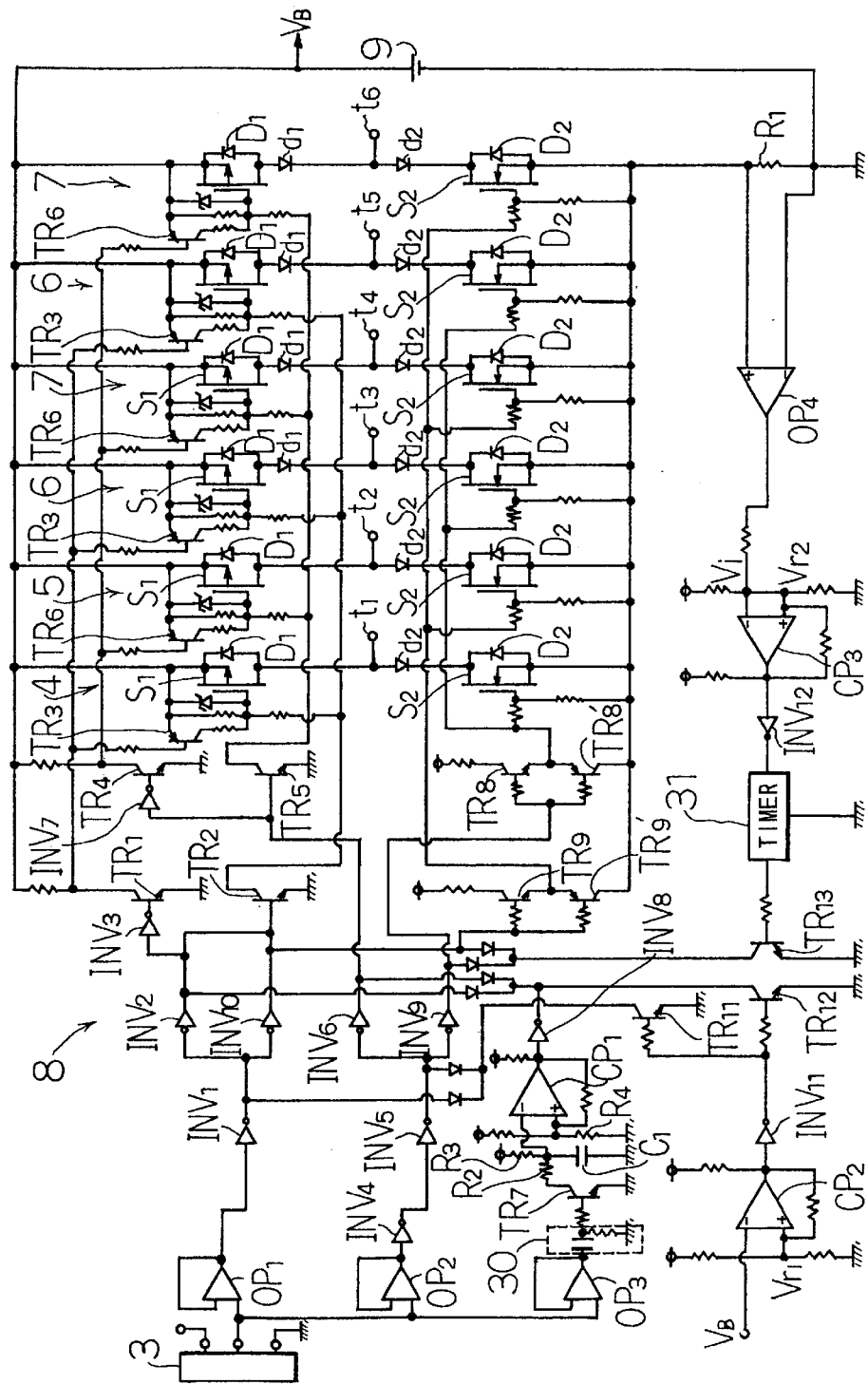
FIG. 17 is a circuit diagram of a concrete example of the switch controller shown in FIG. 2.

FIG. 17 shows an embodiment of a concrete circuit of the switch controller 8 for the six switch circuits as described with respect to the aforementioned embodiment. In this embodiment, when the rotor magnetic pole sensor 3 outputs the signal of H level, the signal of L level is applied to a base of a transistor TR1 through an operational amplifier OP1 connected so as to form a voltage follower circuit and inverter circuits INV1, INV2 and INV3 and therefore the transistor TR1 is at the off state. At that time, since a transistor TR2 has the signal of H level applied to the base thereof and is at the on-state, transistors TR3 forming the driver of the switch elements S1 of the switch circuits 4 and 6 are at the on-state and therefore FETs forming the upper switch elements S1 of the switch circuits 4, 6 and 6 having the intermediate terminals connected to the tap terminals t1, t3 and t5, respectively are at the on-state.

Similarly, when the rotor magnetic pole sensor 3 outputs the signal of H level, the signal of H level is applied to a base of a transistor TR4 through an operational amplifier OP2 and inverter circuits INV4, INV5, INV6 and INV7 and therefore the transistor TR4 is at the on-state. At that time, since the signal of L level is applied to a base of a transistor TR5 and therefore the transistor TR5 is at the off-state, transistors TR6 forming the driver of the switch elements S1 of the switch circuits 5 and 7 are at the off-state.

Also, when the output of the rotor magnetic pole sensor 3 is at H level, an output of an inverter INV9 is at L level and therefore a transistor TR8 is at the off-state. At that time, since no drive signal is applied to FETs forming the lower switch elements S2 of the switch circuits 4 and 6, the switch elements S2 are at the off-state. On the other hand, since an output of an inverter INV10 is at H level, a transistor TR9 is at the on-state. Thus, since a drive signal is applied to MOSFETs forming the lower switch elements S2 of the switch circuits 5 and 7, the switch elements S2 are at the on-state.

As the output of the rotor magnetic pole sensor 3 becomes L level when the polarity of the magnetic pole detected by the sensor is reversed, the output of the inverter INV3 is at the H level and therefore the transistor TR1 is at the on-state. This prevents a base current from being supplied to the respective transistors TR3. Thus, since the transistors TR3 are at the off-state, the drive signal is prevented from being supplied to the upper switch elements S1 of the switch circuits 4 and 6. This turns off the upper switch elements S1 of the switch circuits 4 and 6.

As the output of the rotor magnetic pole sensor 3 is at L level, the outputs of the inverters INV6 and INV7 are at H level and therefore the transistors TR5 are at the on-state. At that time, since the output of the inverter INV7 is at L level, the transistor TR4 is at the off-state and the transistors TR6 forming the driver of the upper switch elements of the switch circuits 5 and 7 are at the on-state. Thus, the upper switch elements Si of the switch circuits 5 and 7 are at the on-state.

Also, when the output of the rotor magnetic pole sensor 3 is at L level, the output of the inverter INV9 is at H level and therefore the transistor TR8 is at the on-state while a transistor TR8' is at the off-state. Since this causes the drive signal to be applied to the lower switch elements S2 of the switch circuits 4 and 6, the switch elements S2 are at the on-state. At that time, since the output of the inverter INV10 is at L level, the transistor TR9 is at the offstate while a transistor TR9' is at the on-state. Thus, since no drive signal is applied to the lower switch elements S2 of the switch circuits 5 and 7, the switch elements S2 are at the off-state.

In the circuit of FIG. 17, whenever the output of the rotor magnetic pole sensor 3 becomes H level, rectangular wave pulses are applied to a differentiation circuit 30 through an operational amplifier OP3. At that time, since the differentiation circuit 30 applies the rectangular wave pulses to the transistor TR7 at the rising portion of the pulses, the transistor TR7 is at the on-state for a short time and therefore the charge of a capacitor C1 is discharged through a resistance R2. When the transistor TR7 is turned off, the capacitor C1 is charged through a resistance R3 with predetermined time constant. While the output frequency of the rotor magnetic pole sensor 3 is low during the low revolution of the engine, the discharge period of the capacitor C1 is long and the time for which the capacitor C1 is charged is long. Thus, the terminal voltage of the capacitor C1 is kept high. As the revolution of the engine increases and the output frequency of the rotor magnetic pole sensor 3 is higher, the discharge distance of the capacitor C1 gets shorter and the time for which the capacitor C1 is charged is shorter. Thus, the voltage across the capacitor C1 gets lower. It will be noted that the terminal voltage of the capacitor C1 varies substantially in inverse proportion to the revolution of the engine. In the illustrated embodiment, circuit constant is so set that the terminal voltage of the capacitor C1 exceeds the reference voltage between both ends of the resistance R4 when the revolution of the engine is less than an engine start completion revolution (one when the engine completes starting).

In the condition in which the revolution of the engine is lower than the engine start completion revolution, the voltage between the both ends of the capacitor C1 is higher than the reference voltage obtained between the both ends of the resistance R4. Thus, since an output of a comparator CP1 is at L level and the output of the inverter INV8 is at H level, the outputs of the inverters INV2 and INV6 are allowed to be changed to H level and L level, respectively. As the revolution of the engine exceeds the engine start completion revolution, the voltage between the both ends of the capacitor C1 gets lower than the reference voltage obtained between the both ends of the resistance R4. Therefore the output of the comparator CP1 is at H level and the output of the inverter INV8 is at L level. This causes the outputs of the inverters INV2 and INV6 to be held at L level. Thus, the transistor TR1 is held at the on-state while the transistor TR5 is held at the off-state.

In this manner, since the transistor TR1 is held at the on-state while the transistor TR5 is at the off-state when the engine completes starting so that the revolution of the engine exceeds the engine start completion revolution, the upper switch elements S1 of the switch circuits 4 through 7 are held at the off-state in spite of the output of the rotor magnetic pole sensor 3, which prohibits the electric rotary machine from being operated as the starter motor.

In this embodiment, the differentiation circuit 30, the transistor TR7, the resistances R2 and R3 and the capacitor C1 constitute a frequency/voltage converter to convert the output frequency of the rotor magnetic pole sensor 3 into the voltage signal.

In the circuit of FIG. 17, the terminal voltage VB of the battery 9 is input to a comparator CP2 so as to be compared with the reference voltage Vr1. As the terminal voltage of the battery 9 is equal to or less than the reference voltage Vr1, the output of the comparator CP2 is at H level and therefore an output of an inverter INV11 is held at L level. At this state, transistors TR11 and TR12 are at the off-state and therefore the outputs of the inverters INV1, INV5, INV2 and INV10 are allowed to change to H level and L level.

As the terminal voltage VB of the battery 9 exceeds the reference voltage Vr1, the output of the comparator CP2 gets L level. Thus, the output of the inverter INV11 gets H level and therefore the transistors TR11 and TR12 gets the on-state. At that time, the outputs of the inverters INV1, INV5, INV2 and INV10 are held at L level. Also, at that time, since both of the inverters INV9 and INV10 are at H level, both of the transistors TR8 and TR9 are turned on and therefore the lower switch elements S2 of the switch circuits 4 and 5 having the intermediate terminals connected to the tap terminals t1 and t2, respectively, are turned-on. This causes the coil W2 to be shorted so that the battery 9 stops being charged.

Also, in the circuits of FIG. 17, the voltage obtained between the both ends of the shunt resistance R1 is amplified through an operational amplifier OP4 and then input as a current detection signal Vi to a comparator CP3 to be compared with a reference voltage Vr2. As the drive signal flowing when the rotary machine is operated as the starter motor exceeds the limit value, the current detection signal Vi exceeds the reference voltage Vr2. Thus, the output of the comparator CP3 is at L level while the inverter INV12 is at H level. This causes a timer 31 to start the timing operation thereof As the timer 31 complete the timing operation, the transistor TR3 has a base current applied thereto so that it is turned on. Thus, the outputs of the inverter INV9 and INV10 are held at L level and therefore the lower switch elements S2 of the respective switch circuits stop being driven so that the drive signals stop being supplied to the coils WI through W6.

Figure 18:
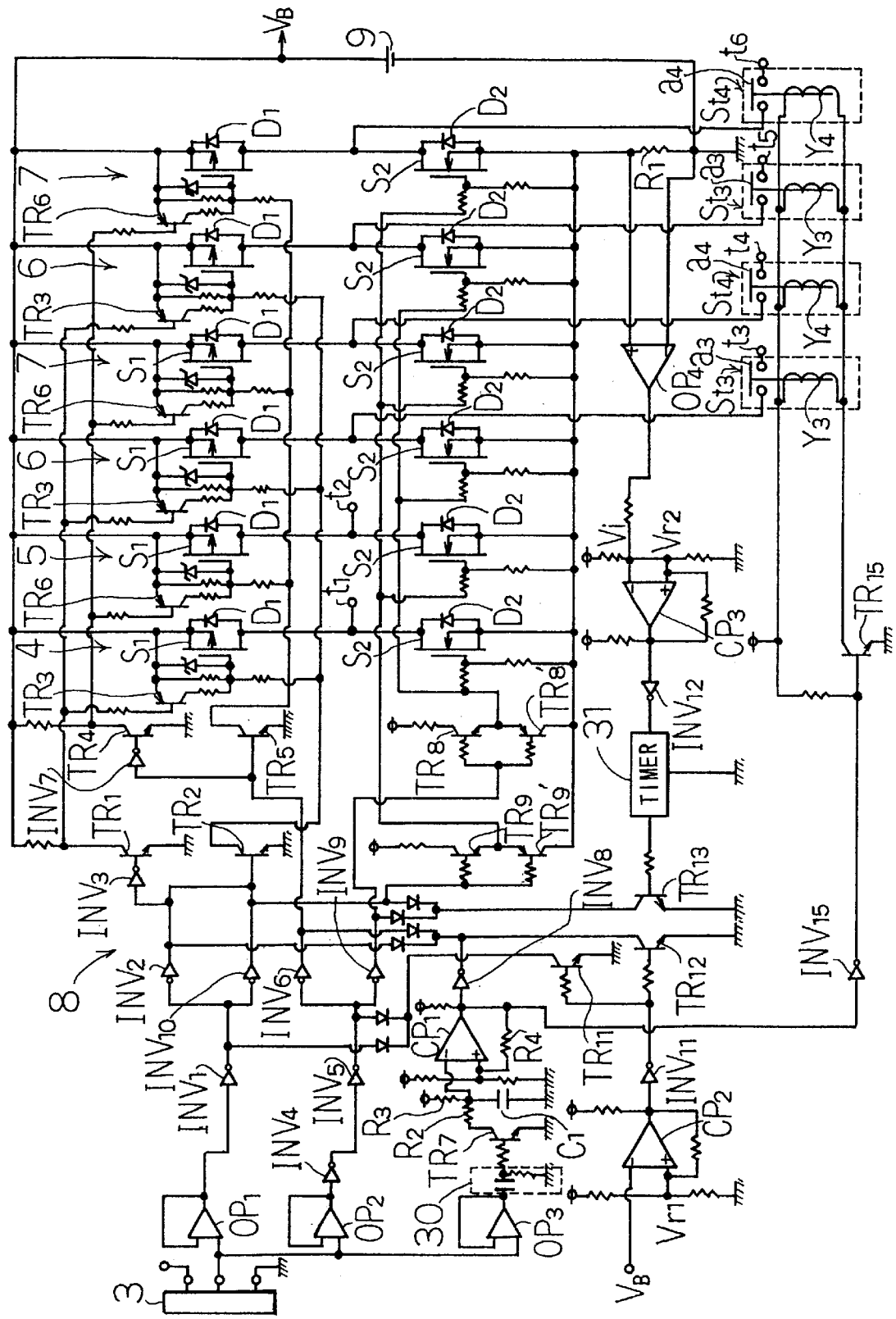
FIG. 18 is a circuit diagram of another concrete example of the switch controller own in FIG. 2.

FIG. 18 illustrates another embodiment of the switch controller 8 for controlling the six switch circuits. In the embodiment, the charge prevention diodes such as the diodes d1 and d2 of FIG. 17 are omitted from the third and fourth switch circuits 6 and 7 and tap selection switches are provided in place of them. The tap selection switches serve to prevent the battery charging current from flowing through the third and fourth switch circuits.

More particularly, in the embodiment of FIG. 18, the third switch circuit 6 has the upper switch element S1 and the lower switch element S2 connected in series to the upper switch element S1. The switch circuit 6 is connected to the both ends of the battery 9 with the upper switch element S1 faced to the positive terminal of the battery 9 and the intermediate terminal led out between the upper and lower switch elements S1 and S2 is connected to at least one of the tap terminals (t3 and t5 in the illustrated embodiment) of the first group of the stator not connected to the intermediate terminal of the first switch circuit 4 through an on-off controllable tap selection switch St3 for the third switch circuit.

The fourth switch circuit 7 is constructed in the same manner as the third switch circuit 6 and the intermediate terminal of the fourth switch circuit 7 is connected to at least one of the tap terminals (t4 and t6 in the illustrated embodiment) of the first group of the stator not connected to the intermediate terminal of the second switch circuit 5 through an on-off controllable tap selection switch St4 for the fourth switch circuit.

In this case, the switch controller 8 controls the respective tap selection switches St3 and St4 so as to turn on these tap selection switches when the revolution of the engine is less than the start completion revolution and turn off these tap selection switches when the revolution of the engine is equal to or more than the start completion revolution. The switch controller 8 also controls the first through fourth switch circuits 4 through 7 to turn on the upper switch elements S1 of the first and third switch circuits 4 and 6 and the lower switch elements S2 of the second and fourth switch circuits 5 and 7 when the output of the rotor magnetic pole sensor is at one of H and L levels and to turn on the upper switch elements S1 of the second and fourth switch circuits 5 and 7 and the lower switch elements S2 of the first and third switch circuits 4 and 6 when the output of the rotor magnetic pole sensor is at the other level whereby the magnet rotor rotates in the rotational direction of the crankshaft when the internal combustion engine should start.

In the illustrated embodiment, relays may be used for the tap selection switches St3 and St4. Normally open contact a3 of the relay forming the tap selection switch St3 is inserted between the intermediate terminal of the third switch circuit 6 and the tap t3 or t5 and normally open contact a4 of the relay forming the tap selection switch St4 is inserted between the intermediate terminal of the fourth switch circuit 7 and the tap t4 or t6. A coil Y3 for the relay forming the tap selection switch St3 and a coil Y4 for the relay forming the tap selection switch St4 are connected in parallel to each other and the parallel circuit of the relays is connected to a not shown electric power supply through a circuit between a collector and an emitter of a transistor TR15. The output of the comparator CP1 is applied through the inverter INV15 to the base of the transistor TR15. Thus, as the revolution of the engine is less than the engine start completion revolution and the output of the comparator CP1 is at L level, the transistor TR15 is at the on-state and the relays forming the tap selection switches St3 and St4 are excited. On the other hand, as the revolution of the engine is equal to or more than the engine start completion revolution and the output of the comparator CP1 is at H level, the transistor TR15 is at the off-state and the relays forming the tap selection switches St3 and St4 are deenergized. The other construction of the switch controller is similar to that shown in FIG. 17.

In the embodiment illustrated in FIG. 18, the tap selection switches St3 and St4 constitute the charge prevention means to prevent the charging current from flowing from the stator to the battery 9 through the third and fourth switch circuits.

In the circuit illustrated in FIG. 18, since the relays forming the tap selection switches St3 and St4, respectively are excited by turning on the transistor TR15 when the revolution of the engine is less than the engine start completion revolution and the output of the comparator CP1 is at L level, the contacts a3 and a4 of the relays forming these tap selection switches are closed and the intermediate terminals of the third and fourth switch circuits 6 and 7 are connected to the predetermined taps, respectively. Thus, when the engine should start, the drive current is applied to all the coils of the stator so that the great torque is given.

As the revolution of the engine exceeds the engine start completion revolution, the output of the comparator CP1 is at H level and therefore the transistor TR15 is at the off-state so that the relays forming the tap selection switches St3 and St4 are deenergized. Thus, the contacts a3 and a4 of the relays forming these tap selection switches are opened and therefore the intermediate terminals of the third and fourth switch circuits 6 and 7 are disconnected from the respective taps. In this manner, after the engine completes starting, the charging current flows from some coils of the stator to the battery 9 through the rectifier circuit formed by the rectifying diodes D1 and D2 of the first and second switch circuits 4 and 5. The operation is similar to that of the embodiment of FIG. 17 except to the aforementioned operation.

Although, in the embodiment of FIG. 18, the tap selection switches are formed the relays, these tap selection switches may be on-off controllable switches other than the relays.

In the embodiment of FIG. 18, the tap selection switches St3 and St4 comprise the individual relays, but they may be formed by a single relay having contacts of predetermined number.

In case that the charge prevention diodes d1 and d2 of FIG. 17 provided in the third and fourth switch circuits prevent the charging current from being supplied to the battery through the third and fourth switch circuits after the engine starts, an undesirable spike voltage is produced by the diodes d1 and d2 when the current flowing through these diodes is interrupted. The spike voltage will adversely affect the operation of the control circuit due to its noise, but with the relays used for preventing the charging current as shown in FIG. 18, such a noise signal is never prevented from being produced.

In the aforementioned embodiments, the magnetic poles of the rotor have the same number of the coils of the stator, but the invention may be generally applied to the rotary machine having the rotor having the n magnetic poles (n is an even number of more than 4) and the stator having m (m=n×α) coils (α is an integral number of more than 1).

Although, in the embodiment of FIG. 17, the switch controller 8 is formed of the hardware circuit, it may be accomplished by practicing a predetermined program by a microcomputer.

According to the invention, since the drive current flows through all the coils of the stator when the internal combustion engine should start so that a great torque can be produced, the engine can start without any trouble. Since the charging current flows from some coils of the stator to the battery through the rectifier circuit formed by the upper and lower rectifying diodes of some switch circuits, an over charging current is prevented from flowing through the battery at middle or high speed of the engine.

Also, according to the invention, since the rotary machine can be operated by using the single rotor magnetic pole sensor, the drive circuit can be advantageously simplified.

Although some preferred embodiments of the invention have been described and illustrated with reference to the accompanying drawings, it will be understood by those skilled in the art that it is by way of example, and that various changes and modifications may be made without departing from the spirit and scope of the invention, which is defined only to the appended claims.

What is claimed is:

1. A starter generator adapted to be driven by a battery when an internal combustion engine should start to drive a crankshaft of an internal combustion engine and to generate an electric power for charging said battery after said internal combustion engine starts, said starter generator comprising;

a magnet rotor mounted on said crankshaft of said internal combustion engine and having n magnet fields (n is an even number) disposed at an equal angle distance:

a stator having m (m=n×α) coils (α is an integral number of more than 1) wound on an armature core with a winding direction identical to each other so that they are placed in order of a rotational direction of said magnet rotor and connected in series in order to each other so that they form a closed circuit and including 1st through mth tap terminals led out from connection points between terminating ends of said 1st through mth coils and beginning ends of said coils adjacent to said 1st through mth coils, respectively, so that alternate tap terminals of the same phase among said tap terminals provide a first group of tap terminals and remaining alternate tap terminals of the phase reverse to those of said first group form a second group of tap terminals;

a rotor magnetic pole sensor to detect whether the magnetic pole of said magnet rotor passing a detection position between the particular two adjacent coils selected among said 1st through mth coils is an N pole or an S pole and to output a magnetic pole detection signal of level different on the N pole and the S pole of said detected magnetic poles;

at least one first switch circuit including an upper switch element and a lower switch element connected in series to said upper switch element, an upper rectifying diode connected in parallel to said upper switch element with an anode faced to said lower switch element; and a lower rectifying diode connected in parallel to said lower switch element with a cathode faced to said upper switch element, said upper switch element being connected to both ends of said battery while being faced to a positive terminal of said battery and an intermediate terminal led out between said upper and lower switch elements being connected at least one of said tap terminals of said first group of said stator;

at least one second switch circuit constructed in the same manner as said first switch element circuit and an intermediate terminal thereof being connected at least one of said tap terminals of said second group;

at least one third switch circuit including an upper switch element and a lower switch element connected in series to said upper switch element, said upper switch element being connected to both ends of said battery while being faced to said positive terminal of said battery and an intermediate terminal led out between said upper and lower switch elements being connected to at least one of said tap terminals of said first group of said stator that is not connected to said intermediate terminal of said first switch circuit;

at least one fourth switch circuit constructed in the same manner as said third switch element circuit and an intermediate terminal thereof being connected at least one of said tap terminals of said second group that is not connected to said intermediate terminal of said second switch circuit;

charge prevention means to prevent a charging current from being supplied from said stator through said third and fourth switch circuits to said battery;

and a switch controller to control said first through fourth switch circuits to turn on said upper switch elements of said first and third switch circuits and said lower switch elements of said second and fourth switch circuits when an output of said rotor magnetic pole sensor is at one of the levels and to turn on said upper switch elements of said second and fourth switch circuits and said lower switch elements of said first and third switch circuits when the output of said rotor magnetic pole sensor is at the other level whereby said magnet rotor rotates in the rotational direction of said crankshaft when said internal combustion engine should start.

2. A starter generator for an internal combustion engine as set forth in claim 1 and wherein said charge prevention means comprises an upper charge prevention diode disposed between said upper switch element of said third switch circuit and said intermediate terminal thereof with an anode thereof faced to said intermediate terminal, a lower charge prevention diode disposed between said lower switch element of said third switch circuit and said intermediate terminal thereof with a cathode thereof faced to said intermediate terminal, an upper charge prevention diode disposed between said upper switch element of said fourth switch circuit and said intermediate terminal thereof with an anode thereof faced to said intermediate terminal and a lower charge prevention diode disposed between said lower switch element of said fourth switch circuit and said intermediate terminal thereof with a cathode faced to said intermediate terminal.

3. A starter generator for an internal combustion engine as set forth in claim 1 and wherein said charge prevention means comprises tap selection switches inserted between said intermediate terminal of said third switch circuit and said intermediate terminal thereof and between said intermediate terminal of said fourth switch circuit and said intermediate terminal thereof, respectively and said tap selection switches being adapted to be turned on when said internal combustion engine should start and turned off after said internal combustion engine starts and when said battery should be charged.

4. A starter generator for an internal combustion engine comprising a magnet rotor mounted on a crankshaft of said internal combustion engine and having n magnet fields (n is an even number) disposed at an equal angle distance;

a stator having m(m=n×α) coils (α is an integral number of more than 1) wound on an armature core with a winding direction identical to each other so that they are placed in order of a rotational direction of said magnet rotor and connected in series in order to each other so that they form a closed circuit and including 1st through mth tap terminals led out from connection points between terminating ends of said 1st through mth coils and beginning ends of said coils adjacent to said 1st through mth coils so that alternate tap terminals of the same phase among said tap terminals provide a first group of tap terminals and remaining alternate tap terminals of the phase reverse to those of said first group form a second group of tap terminals;

a rotary magnetic pole sensor to detect whether the magnetic pole of said magnet rotor passing a detection position between particular two adjacent coils selected among said 1st through mth coils is an N pole or an S pole and to output a magnet pole detection signal of level different on the N pole and the S pole of said detected magnetic poles;

at least one first switch circuit including an upper switch element and a lower switch element connected in series to said upper switch element, an upper rectifying diode connected in parallel to said upper switch element with an anode thereof faced to said lower switch element; and a lower rectifying diode connected in parallel to said lower switch element with a cathode thereof faced to said upper switch element, said upper switch element being connected to both ends of said battery while being faced to a positive terminal of said battery and an intermediate terminal led out between said upper and lower switch elements being connected at least one of said tap terminals of said first group of said stator;

at least one second switch circuit constructed in the same manner as said first switch circuit and an intermediate terminal thereof being connected to at least one of said tap terminals of said second group;

at least one third switch circuit having an upper arm including a series circuit of an upper switch element and an upper charge prevention diode disposed in a forward direction relative to a conduction direction of said upper switch element when it is turned on and a lower arm including a lower switch element and a lower charge prevention diode disposed in a forward direction relative to a conduction direction of said lower switch element when it is turned on and connected in series to said upper arm, said upper arm being connected to both ends of said battery while being placed on the side of a positive terminal of said battery and an intermediate terminal led out between said upper and lower arms being connected to at least one of said tap terminals of said first group of said stator that is not connected to said intermediate terminal of said first switch circuit;

at least one fourth switch circuit constructed in the same manner as said third switch circuit and an intermediate terminal thereof being connected at least one of said tap terminals of said second group that are not connected to said intermediate terminal of said second switch circuit;

and a switch controller to control said first through fourth switch circuits to turn on said upper switch elements of said first and third switch circuits and said lower switch elements of said second and fourth switch circuits when an output of said rotor magnetic pole sensor is at one of said levels and to turn on said upper switch elements of said second and fourth switch circuits and said lower switch elements of first and third switch circuits when the output of said rotor magnetic pole sensor is at the other level whereby said magnet rotor rotates in the rotational direction of said crankshaft when said internal combustion engine should start.

5. A starter generator for an internal combustion engine comprising a magnet rotor mounted on a crankshaft of said internal combustion engine and having n magnet fields (n is an even number) disposed at an equal angle distance;

a stator having m (m=n×α) coils (α is an integral number of more than 1) wound on an armature core with a winding direction identical to each other so that they are placed in order of a rotational direction of said magnet rotor and connected in series in order to each other so that they form a closed circuit and including 1st through mth tap terminals led out from connection points between terminating ends of said 1st through mth coils and beginning ends of said coils adjacent to said 1st through mth coils, respectively, so that alternate tap terminals of the same phase among said tap terminals provide a first group of tap terminals and remaining alternate tap terminals of the phase reverse to those of said first group form a second group of tap terminals;

a rotary magnet pole sensor to detect whether the magnetic pole of said magnet rotor passing a detection position between particular two adjacent coils selected among said 1st through mth coils is an N pole or an S pole and to output a magnet pole detection signal of level different on the N pole and the S pole of said detected magnetic poles;

at least one first switch circuit including an upper switch element and a lower switch element connected in series to said upper switch element, an upper rectifying diode connected in parallel to said upper switch element with an anode thereof faced to said lower switch element; and a lower rectifying diode connected in parallel to said lower switch element with a cathode thereof faced to said upper switch element, said upper switch element being connected to both ends of said battery while being faced to a positive terminal of said battery and an intermediate terminal led out between said upper and lower switch elements being connected to at least one of said tap terminals of said first group of said stator;

at least one second switch circuit constructed in the same manner as said first switch circuit and an intermediate terminal thereof being connected to at least one of said tap terminals of said second group;

at least one third switch circuit including an upper switch element and a lower switch element connected in series to said upper switch element, said upper switch element being connected to both ends of said battery while being faced to said positive terminal of said battery and an intermediate terminal thereof led out between said upper and lower switch elements being connected through on-off controllable tap selection switches for said third switch circuit to at least one of said tap terminals of said first group of said stator that is not connected to said intermediate terminal of said first switch circuit;

at least one fourth switch circuit constructed in the same manner as said third switch circuit and an intermediate terminal thereof being connected through on-off controllable tap selection switches for said fourth switch circuit to at least one of said tap terminals of said second group that are not connected to said intermediate terminal of said second switch circuit;

and a switch controller to control said respective tap selection switches so as to turn on said respective tap selection switches when the revolution of said internal combustion engine is equal to or less than an engine start completion revolution and to turn off said respective tap selection switches when the revolution of said internal combustion engine is equal to or more than said engine start completion revolution and also to control said first through fourth switch circuits to turn on said upper switch elements of said first and third switch circuits and said lower switch elements of said second and fourth switch circuits when an output of said rotor magnetic pole sensor is at one of said levels and to turn on said upper switch elements of said second and fourth switch circuits and said lower switch elements of first and third switch circuits when the output of said rotor magnetic pole sensor is at the other level whereby said magnet rotor rotates in the rotational direction of said crankshaft when said internal combustion engine starts.

6. A starter generator for an internal combustion engine as set forth in claim 4 or 5 and wherein said 1st through mth coils are formed by winding coil conductor on an armature core in a lap winding manner while inserted into many slots in said armature core and a pitch of said lap wound coils is so set that a plurality of said magnetic poles of said rotor are placed inside of said respective coils.

7. A starter generator for an internal combustion engine as set forth in claim 4 or 5 and further comprising voltage control means to control said switch elements so that said lower switch elements of said first and second switch circuits are simultaneously is turned in the condition that upper switch elements of said first and second switch circuits are held at the off-state when a voltage between both ends of said battery exceeds a set value.

8. A starter generator for an internal combustion engine as set forth in claim 4 or 5 and wherein said 1st through mth coils are formed by winding coil conductor on an armature core in a lap winding manner while inserted into many slots in said armature core and a pitch of said superposed coils is so set that a plurality of said magnetic poles of said rotor are placed inside of said respective coils and further comprising voltage control means to control said switch elements so that said lower switch elements of said first and second switch circuits are simultaneously is turned in the condition that upper switch elements of said first and second switch circuits are held at the off-state when a voltage between both ends of said battery exceeds a set value.

9. A starter generator for an internal combustion engine comprising a magnet rotor mounted on a crankshaft of said internal combustion engine and having n magnet fields (n is an even number) disposed at an equal angle distance;

a stator having m (m=n×α) coils (α is an integral number of more than 1) wound on an armature core with a winding direction identical to each other so that they are placed in order of a rotational direction of said magnet rotor and connected in series in order to each other so that they form a closed circuit and including m tap terminals led out from connection points between terminating ends of said m coils and beginning ends of said coils adjacent to said m coils, respectively, so that alternate tap terminals of the same phase among said m tap terminals provide a first group of tap terminals and remaining alternate tap terminals of the phase reverse to those of said first group form a second group of tap terminals;

a rotary magnet pole sensor to detect whether the magnetic pole of said magnet rotor passing a detection position between particular two adjacent coils selected among said 1st through mth coils is an N pole or an S pole and to output a magnet pole detection signal of level different on the N pole and the S pole of said detected magnetic poles;

m switch circuits each including an upper arm provided on said m tap terminals, respectively and a lower arm connected in series to said upper arm and said upper arm being connected to both ends of said battery while being placed on the side of a positive terminal of said battery and terminals led out between said upper and lower arms being connected to the corresponding tap terminals, respectively;

and switch controller to control said switch circuits;

said upper arm of said respective switch circuits including an upper main switch element allowing to pass a current flowing out from said battery when said upper arm is turned on, an upper control switch element connected in series to said upper main switch element so that a direction in which a current flows when said upper control switch element is turned on is reverse to a direction in which said current flows when said upper main switch element is turned on, an upper rectifying diode connected in parallel to said upper main switch element while being directed in a direction reverse to a conduction direction of said upper main switch element when it is turned on and an upper bypassing diode connected in parallel to said upper control switch element while being directed in a direction reverse to a conduction direction of said upper control switch element when it is turned on;

said lower arm of said respective switch circuits including a lower main switch element allowing to pass a current being fed back to said battery when said lower arm is turned on, a lower control switch element connected in series to said lower main switch element so that a direction in which a current flows when said lower control switch element is turned on is reverse to a direction in which said current flows when said lower main switch element is turned on, a lower rectifying diode connected in parallel to said lower main switch element while being faced in a direction reverse to a direction in which said current flows when said lower main switch element is turned on and a lower bypassing diode connected in parallel to said lower control switch element while being directed in a direction reverse to a direction in which said current flows when said lower control switch element is turned on;

and said switch controller being constructed to control said switch circuits so as to turn on said upper main switch elements of said switch circuits having said intermediate terminal connected to said tap terminals of said first group and said lower main switch elements of said switch circuits having said intermediate terminal connected to said tap terminals of said second group when an output of said rotor magnetic pole sensor is at one of said levels and to turn on said upper main switch elements of said switch circuits having said intermediate terminal connected to said tap terminals of said second group and said lower main switch elements of said switch circuits having said intermediate terminal connected to said tap terminals of said first group when the output of said rotor magnetic pole sensor is at the other level whereby said magnet rotor rotates in the rotational direction of said crankshaft when said internal combustion engine should start and constructed to maintain the off-state of both of said upper and lower main switch elements of said respective switch circuits and maintain the off-state of said upper and lower control switch elements of predetermined switch circuits selected in accordance with an objective value of a charging current of said battery while said upper and lower control switch elements of other switch circuits are maintained at the on-state.

* * * * *

UNITED STATES PATENT AND TRADEMARK OFFICE
CERTIFICATE OF CORRECTION

PATENT NO. : 6,392,311 B2  
DATED : May 21, 2002  
INVENTOR(S) : Inaba et al.

It is certified that error appears in the above-identified patent and that said Letters Patent is hereby corrected as shown below:

Column 11,  
Line 2, delete "1c" and insert -- ic --.  
Line 67, delete "time. To" and insert -- time To --.

Column 17,  
Line 18, delete "Si" and insert -- S1 --.

Signed and Sealed this

Nineteenth Day of November, 2002

*Attest:*

*Attesting Officer*

JAMES E. ROGAN  
*Director of the United States Patent and Trademark Office*